Oct. 9, 1934.  G. W. SKOULAND  1,976,042
ROTARY INTERNAL COMBUSTION ENGINE
Filed June 12, 1929   10 Sheets-Sheet 1

Inventor.
George W. Skouland,
By R. S. Berry
Atty.

Oct. 9, 1934.    G. W. SKOULAND    1,976,042
ROTARY INTERNAL COMBUSTION ENGINE
Filed June 12, 1929    10 Sheets-Sheet 2
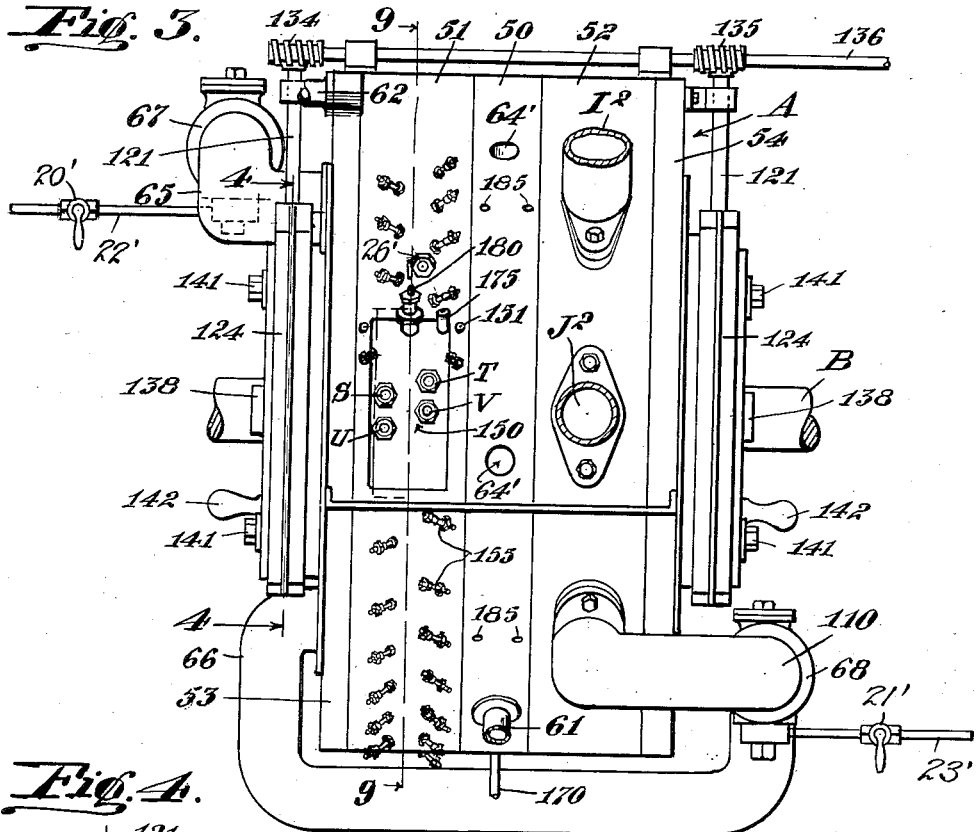
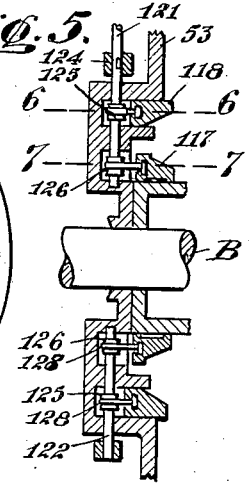
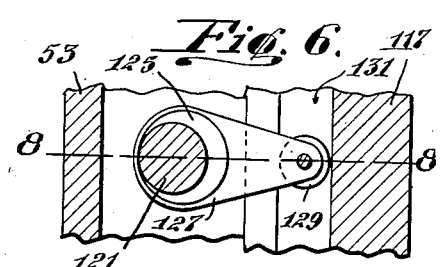
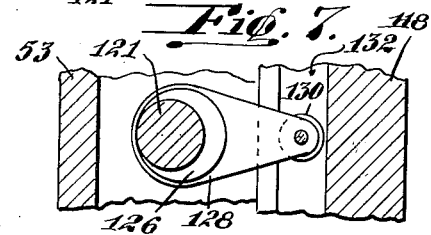
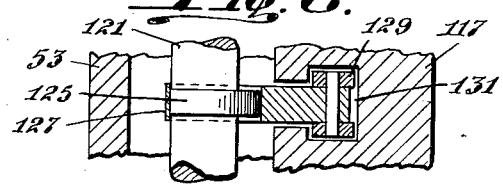
Inventor:
George W. Skouland;
By R. S. Berry,
Atty.

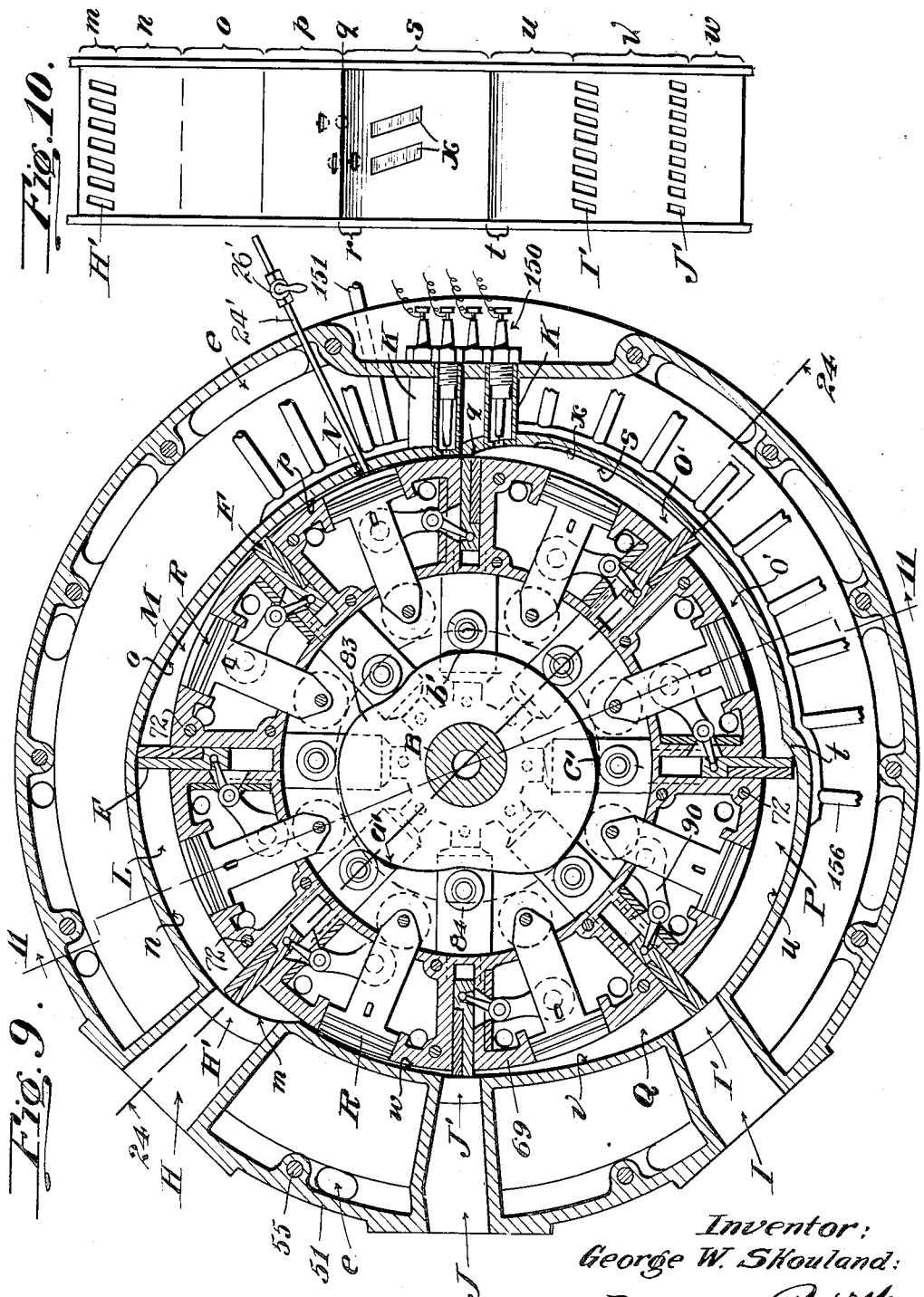

Oct. 9, 1934.   G. W. SKOULAND   1,976,042
ROTARY INTERNAL COMBUSTION ENGINE
Filed June 12, 1929   10 Sheets-Sheet 4
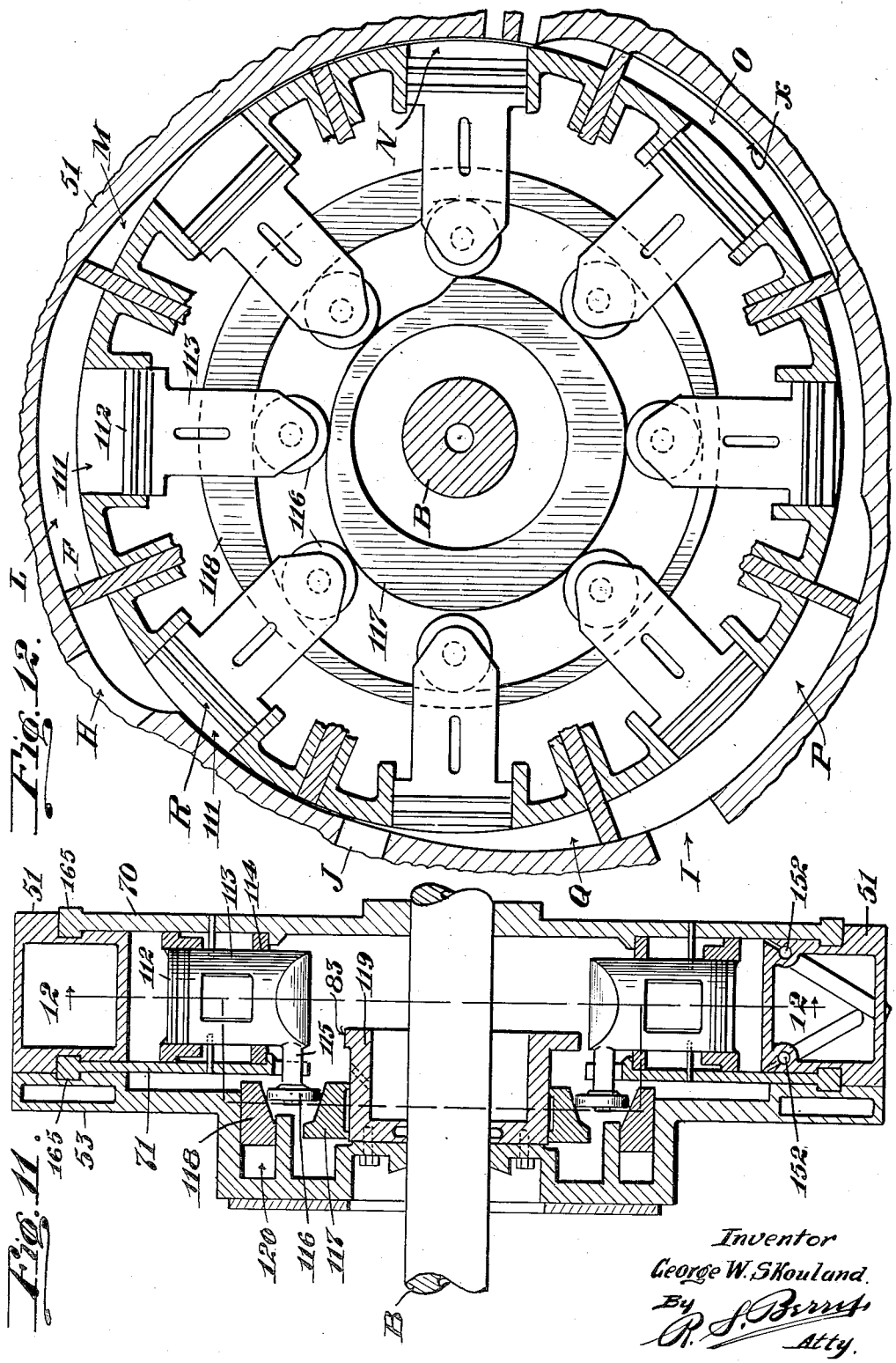
Inventor
George W. Skouland
By R. S. Berry
Atty.

Oct. 9, 1934.  G. W. SKOULAND  1,976,042
ROTARY INTERNAL COMBUSTION ENGINE
Filed June 12, 1929    10 Sheets-Sheet 5
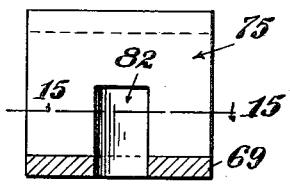
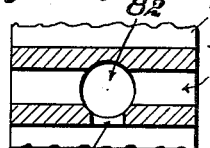
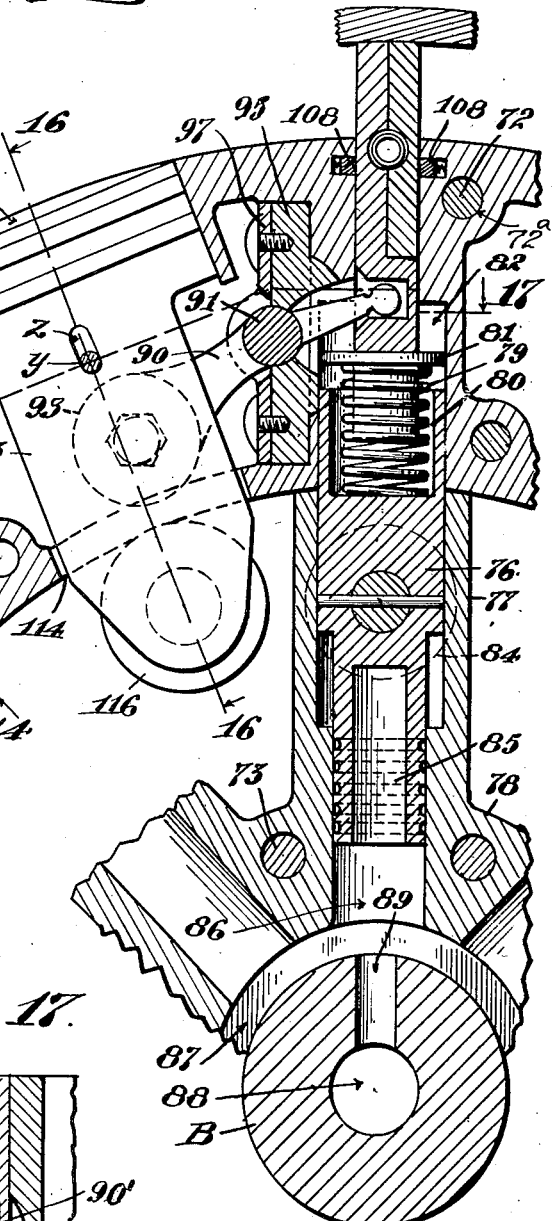
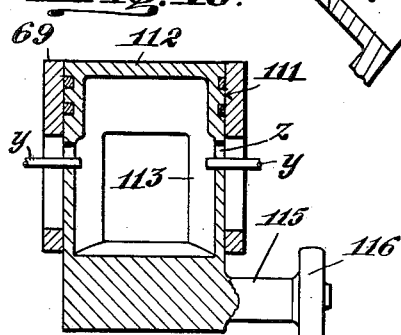
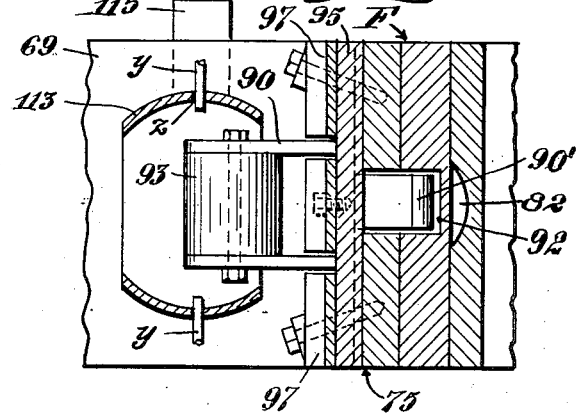
Inventor
George W. Skouland
By R. S. Berry
Att'y

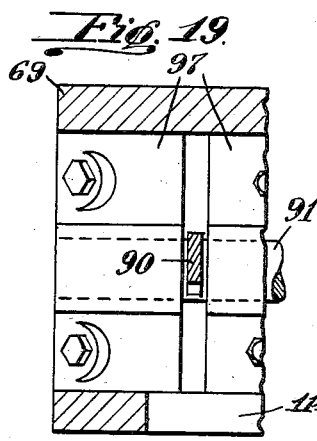
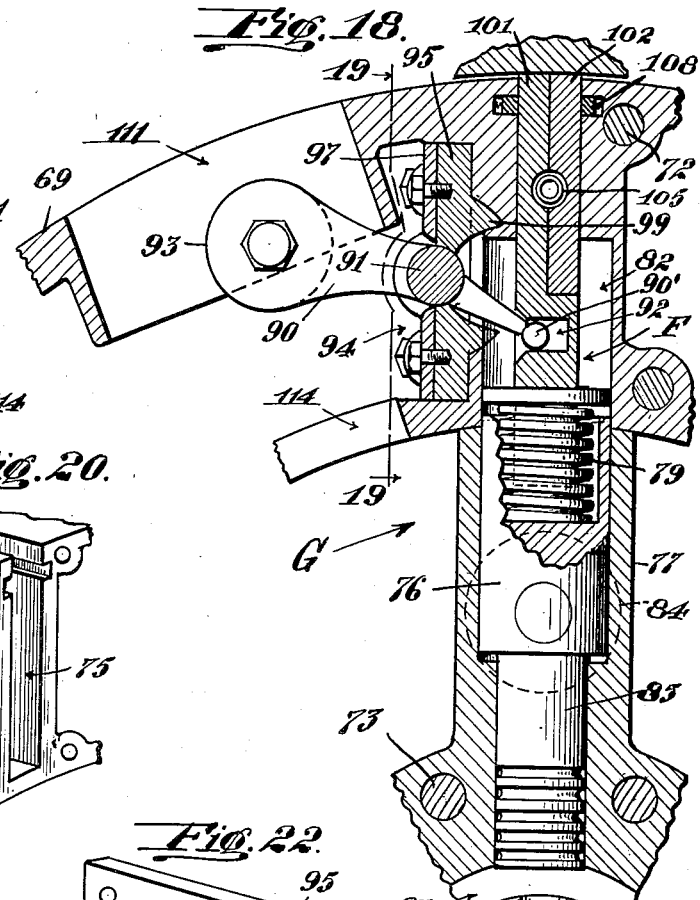
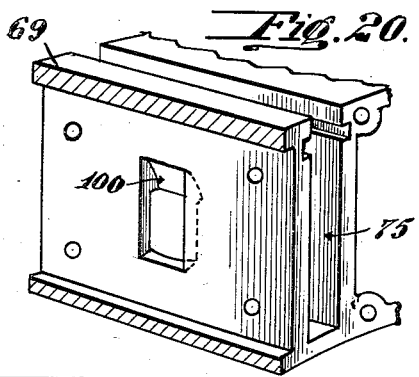
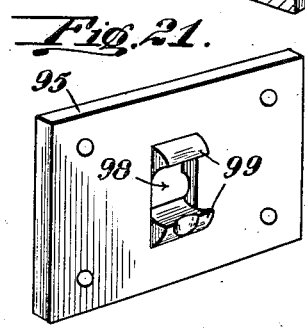
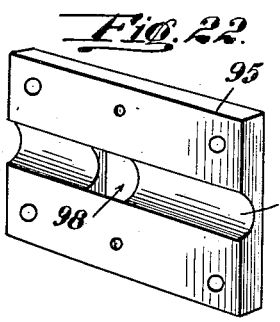
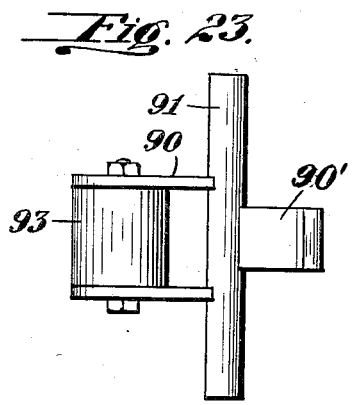

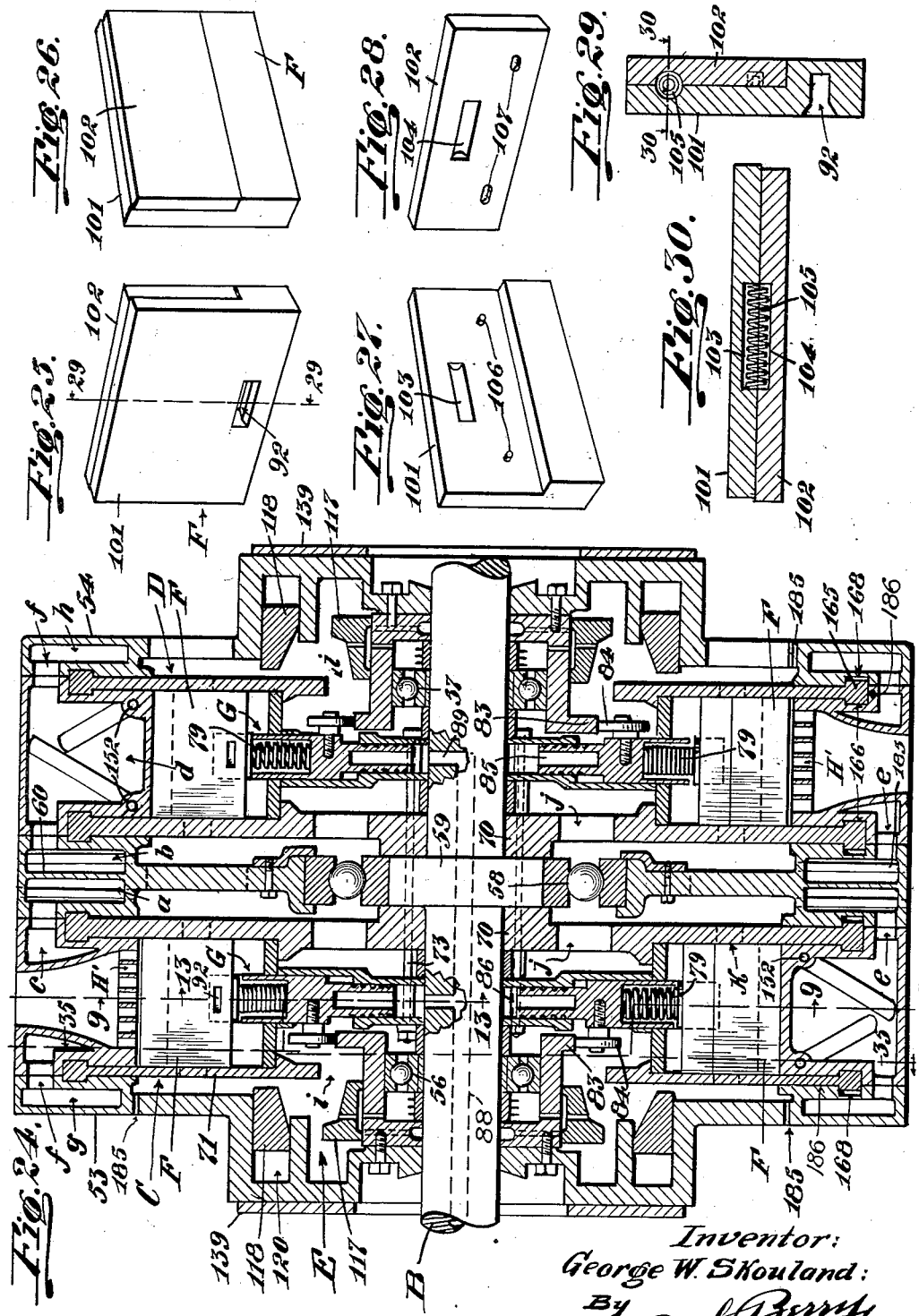

Oct. 9, 1934.   G. W. SKOULAND   1,976,042
ROTARY INTERNAL COMBUSTION ENGINE
Filed June 12, 1929   10 Sheets-Sheet 8
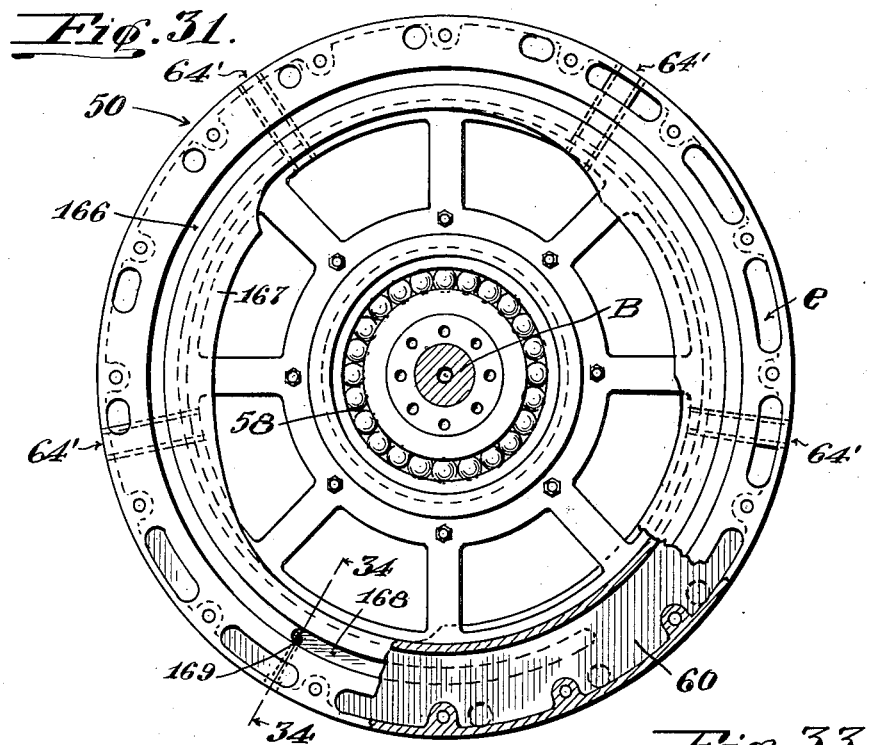
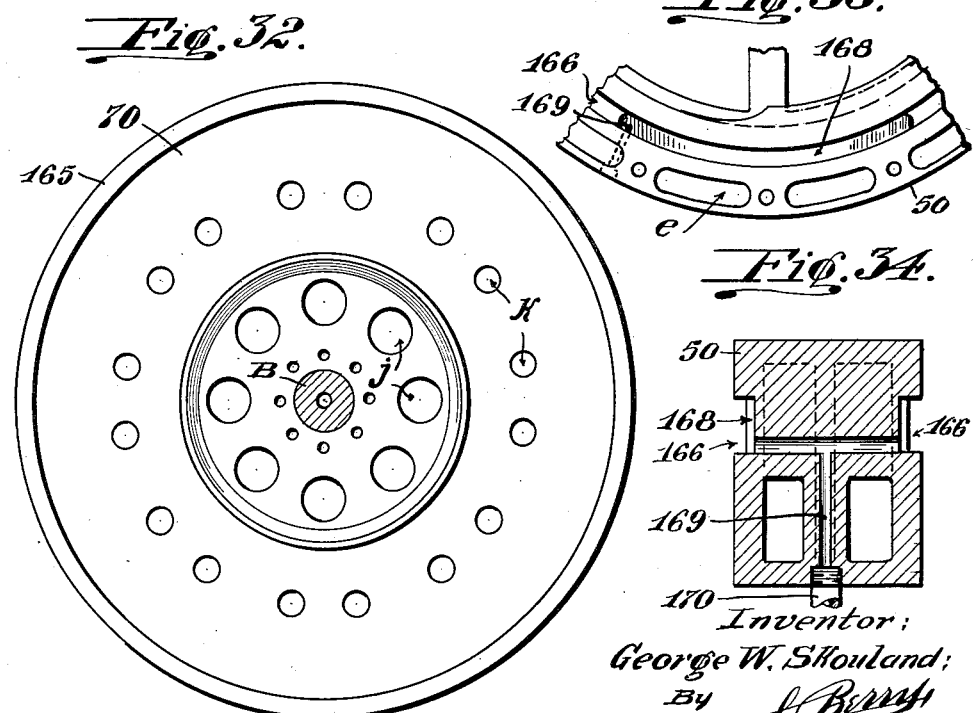
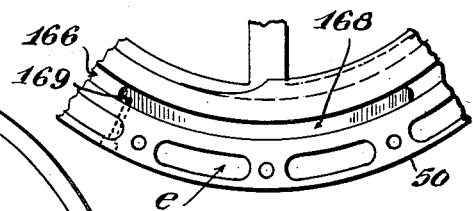
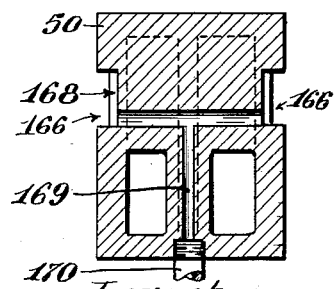
Inventor:
George W. Skouland;
By R. S. Berry
Atty.

Oct. 9, 1934.  G. W. SKOULAND  1,976,042
ROTARY INTERNAL COMBUSTION ENGINE
Filed June 12, 1929  10 Sheets-Sheet 9

Inventor:
George W. Skouland
By R. S. Berry
Atty.

Oct. 9, 1934.  G. W. SKOULAND  1,976,042
ROTARY INTERNAL COMBUSTION ENGINE
Filed June 12, 1929  10 Sheets—Sheet 10
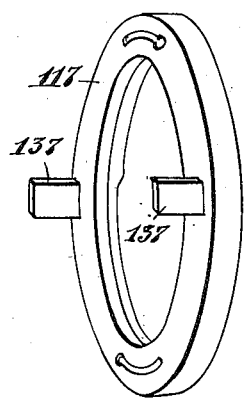
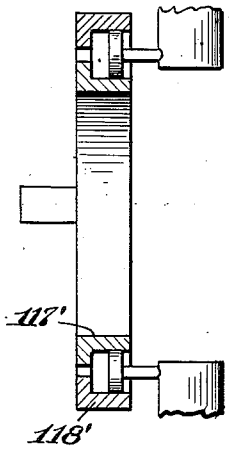
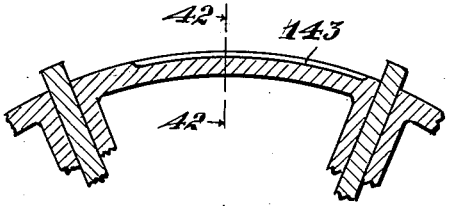
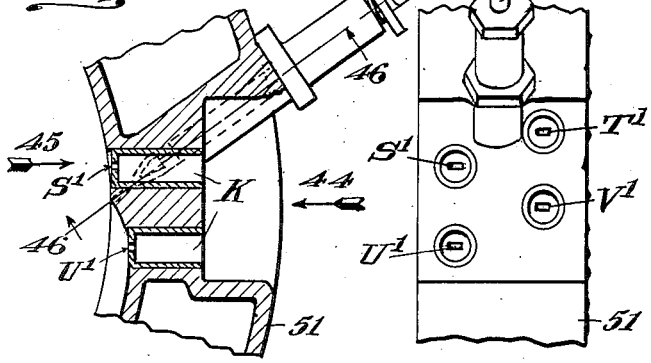
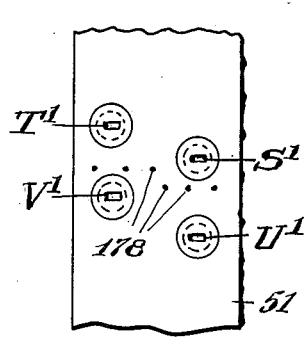
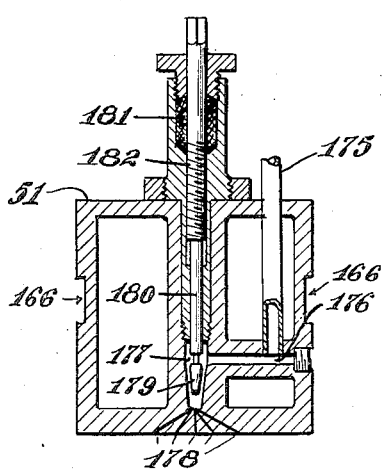
Inventor
George W. Skouland
By R. S. Burs
Atty.

Patented Oct. 9, 1934

1,976,042

UNITED STATES PATENT OFFICE 1,976,042

ROTARY INTERNAL COMBUSTION ENGINE

George W. Skouland, Los Angeles, Calif.

Application June 12, 1929, Serial No. 370,180

42 Claims. (Cl. 123—16)

This invention relates to an internal combustion rotary engine of the type embodying a rotor carrying a plurality of radially extending slidable blades arranged in a stator profiled on its inner periphery to form intake, compression, combustion and exhaust chambers between a series of contiguous blades, and in which revolving of the rotor is effected by the combustion and consequent expansion of a compressed fluid fuel rearward of successively advancing blades; the invention especially relating to the type of engine disclosed in my co-pending application for United States Letters Patent Serial Number 290,581 filed July 5, 1928 of which this application is a continuation at least in part.

An object of the invention is to provide a rotary engine of the above type which is multi-stage, in which compounded expansion of the combusted charge is effected, and in which a prolongation of the period of flame propagation and maximum time of sustained high temperature of the fuel is afforded thereby obtaining a complete combustion of the fuel and the fullest utilization of the resultant expansive force thereof, and whereby high speed of velocity of the rotor and consequent production of a maximum of power with a minimum of fuel consumption is accomplished.

Another object is to provide a multi-stage internal combustion rotary engine that may be operated with fuels of either high or low gravity as desired and without effecting any changes in the engine structure other than by varying the manner of delivery of the fuel according to the character of the fuel employed, thus accommodating the engine to the use of fuels that may be most conveniently available, and in which the flash principle of ignition may be employed with either grade of fuel.

Another object is to provide an internal combustion rotary engine in which an absolute static and dynamic balance at all phases of its operation and at all speeds, is attained, in which friction and vibration are practically eliminated thereby reducing to a negligible minimum the wear of parts and the consequent necessity for replacement thereof, and in which the effect of lateral expansion is so controlled as to prevent any operating interference.

Another object is to provide an arrangement in an internal combustion rotary engine whereby the friction due to centrifugal force acting upon slidable vanes at high speeds may be eliminated and the pressure of the outer ends of the vanes against a stator may be regulated to the exact pressure required to effect actuation of the vanes and prevent leakage of gases between the ends of the vanes and the interior surface of the stator, and such pressure varied according to speed of operation.

Another object is to provide a means for counteracting the action of centrifugal force on vanes by the use of counterweights.

Another object is to provide a multi-stage internal combustion rotary engine of such design as to obviate, in its construction and operation, the use of valves, gears, chains and ignition timers, and in which the rotor and vanes serve the usual purposes of valves, pistons and ignition timers, and in which the profiles of the stator in conjunction with side plates on the rotor and the blades or vanes with or without auxiliary compression pistons form within the engine all passages and chambers for the movement and enclosure of gases or vapors through the induction, compression, power and exhaust cycles of the engine.

Another object is to provide a multi-stage and multi-vane internal combustion rotary engine in which the co-related cycles, namely, induction, compression, combustion and exhaust, are so applied and arranged as to make the duration of the combustion and power cycle equal to the combined time of the other three cycles to the end that the period of flame propagation, combustion and expansion in and of the fuel is increased and whereby the maximum of expansion capacity of the fuel is converted into and used as power with a minimum of waste, and in which the duration of the period of flame propagation, combustion and expansion is identical with such periods as are employed in a reciprocating engine to wit: one-half revolution of the crank shaft.

Another object is to provide a multi-stage internal combustion rotary engine in which the fluid fuel is induced to enter an annular chamber concentric with the rotor by means of the vacuum created by movement of a blade or vane carried by the rotor riding in contact with the stator profile to dispose a charge between the inducing vane and the vane next following; in which the inducted charge is compressed as it is advanced and fired at the point of maximum compression, which compression because of speed of development may be much higher than possible in any other type of engine, and on its initial expansion caused to act on the exposed area of the leading vane to thus impart full power of the force of the initial expansion of the fuel charge to the leading vane for a short period and thereafter pass over and beyond the leading vane so as to exert force upon said leading vane by the velocity of the flow of gases over said vane and also impart additional power to the next preceding vane due to the expansion of the flowing gases (these two functions being accomplished under a very high working pressure in the equivalent of two stages of expansion).

In the stage preceding the exhaust of the exploded charge a greatly increased vane area will be presented thereto and the entire remaining expansive force utilized in a third or low pressure stage; the relative area of chambers being such as to make possible a low stage expansion to approximately atmospheric pressure.

Another object is to provide a multi-stage internal combustion rotary engine so designed as to practically eliminate loss of power due to the action of back pressure or negative pressure between the vanes which is accomplished by locating the combustion chamber in the body of the rotor in such manner that the clearance between the main body of the rotor and the stator at the point of compression and combustion is only that which is necessary to provide for radial expansion of the parts and whereby the entire expansive forces of the fuel are employed to exert useful force upon appropriate vanes with no negative pressure during the high pressure stages or 90° of shaft movement.

Another object is to provide a multi-stage internal combustion rotary engine so designed as to have no waste movements, dead centers, leak losses, or points of inertia between cycles and in which each charge of explosive mixture induced, is a complete, new, fresh charge uncontaminated by exploded and burned, or partly burned, gases from previous charges.

Another object is to provide a multi-stage internal combustion rotary engine in which maximum efficiency in the ejection and scavenging of exhaust gases is effected, and in which a plurality of exhaust passages are so provided as to eliminate negative pressure.

Another object is to provide a multi-stage rotary internal combustion engine so designed as to practically eliminate fuel losses, due to leaks of gases during the functioning through the several cycles, and whereby such negligible quantities of gases as may leak out of a functioning chamber can pass only to the next preceding or following chamber and there be used over in developing power except in the case of such leakage at low pressure stage as may occur for a brief period just preceding and during the time of exhaust.

Another object is to provide an effective means for affording lubrication of the engine parts and for providing an oil film between the contiguous surfaces of relatively movable parts, as between the rotor and the stator, the blades and rotor, and between the stator and the rotor blades, whereby an effective oil seal will be formed between adjacent chambers in the engine and whereby an effective seal is obtained between the engine chambers without the use of rings, glands or other mechanical seals, and to provide means for scavenging surplus oil and to maintain exactly the correct working oil level in any position of the engine.

Another object is to provide a lubricating means for an internal combustion rotary engine in which at high speeds a lubricant is distributed to the contiguous surface of the stator and rotor by centrifugal force produced by revolving of the rotor, the side plates of which function as pump runners generating sufficient pressure in the oil body in chambers to resist the escape pressure of the gases, and in which the lubricant so distributed will be drawn from reservoirs or oil pockets so arranged as to afford a supply of lubricant for immediate distribution on initial revolution of the rotor.

Another object is to provide a lubricating means for an internal combustion rotary engine in which at low speeds oil is introduced along the inner periphery of the stator contiguous the explosion and expansion pressure chambers under pressure high enough to produce a sealing film to resist the escape pressure of the gases.

Another object is to provide a lubricating means for an internal combustion rotary engine through which obstructions in oil feeds resulting from coking due to high temperatures may be cleared without stopping the engine or disassembling any parts.

Another object is to provide an effective means for cooling a rotary internal combustion engine embodying means whereby both air and water are employed as a cooling medium and in which the flow of the water through the water jacket of the engine is so directed as to be highly efficacious in absorbing heat at points of the engine where most needed and in controlling direction of expansion, and in which the air employed as a cooling medium is so directed as to effect cooling of internal portions of the engine and thereafter may be utilized as a constituent of the fuel charge.

Another object is to provide an ignition means for rotary internal combustion engines which will obviate the employment of timers, make and break contacts, or other usual means of controlling timing of the ignition, which is especially advantageous in the development of high speed of rotation of the engine rotor, and which is such as to augment the flame propagation in the chamber under fire.

Another object is to provide an internal combustion rotary engine in which multiplicity of rotors may be employed and in which either one or more of the rotors may be propelled as occasion may require according to varying conditions of load or work to be performed.

Another object is to provide a multi-stage internal combustion rotary engine in which the high initial compression pressure of the fuel charge is generated with great rapidity in a few degrees of shaft revolution immediately preceding ignition, with a minimum expenditure of effort in its generation, and in which the action of centrifugal force aids in effecting such compression.

Another object is to provide a multi-stage internal combustion rotary engine in which the compression can be varied at the will of the operator through a wide range of pressure, whereby especially in aeronautical service sea level compression efficiency may be maintained at very high altitudes and in low gravity fuel engines a compression pressure may be had that best suits the particular grade of fuel being used.

With the foregoing objects in view, together with such other objects and advantages which may subsequently appear, the invention resides in the parts and features and in the combination, construction and arrangement of parts, or the equivalents thereof, hereinafter described and claimed, and illustrated by way of example in the accompanying drawings, in which:

Fig. 3 is a view of the motor as seen in side elevation in the direction indicated by the arrow 3 in Fig. 1.

Fig. 4 is a detail in section taken on the line 4—4 of Fig. 3.

Fig. 5 is a sectional view taken on the line 5—5 of Fig. 4.

Fig. 6 is an enlarged cross section as seen on the line 6—6 of Fig. 5.

Fig. 7 is an enlarged cross section taken on the line 7—7 of Fig. 5.

Fig. 8 is a detail in cross section as seen on the line 8—8 of Fig. 6.

Fig. 9 is a view in section as seen on the line 9—9 of Fig. 3 and Fig. 24.

Fig. 10 is a diagram illustrating the profile of the stator.

Fig. 11 is a detail in section as seen on line 11—11 of Fig. 9 with portions removed.

Fig. 12 is a diagrammatic view with parts exaggerated as seen on line 12—12 of Fig. 11.

Fig. 13 is an enlarged detail in section of a fragmentary portion of the rotor as seen on the line 13—13 of Fig. 24.

Fig. 14 is a detail in section taken on the line 14—14 of Fig. 13 showing the vane slot.

Fig. 15 is a detail in section taken on the line 15—15 of Fig. 14.

Fig. 16 is a sectional view on reduced scale taken on the line 16—16 of Fig. 13.

Fig. 17 is a horizontal section taken on the line 17—17 of Fig. 13.

Fig. 18 is a sectional view similar to that of Fig. 13 with parts shown in alternate position.

Fig. 19 is a detail in section in elevation as seen in the line 19—19 of Fig. 18.

Fig. 20 is a detail in perspective showing the vane-receiving slot portion of the rotor.

Fig. 21 is a perspective view of a bearing plate shown in section in Fig. 18.

Fig. 22 is a perspective view of the bearing side of the plate shown in Fig. 21.

Fig. 23 is a plan view of a counterweight particularly shown in Fig. 18.

Fig. 24 is a view in longitudinal section taken on the line 24—24 of Fig. 9.

Figs. 25 and 26 are perspective views of a vane as seen from opposite sides thereof.

Figs. 27 and 28 are perspective views of separable portions of the vane.

Fig. 29 is a view of the vane in cross section as seen on the line 29—29 of Fig. 25.

Fig. 30 is a detail in horizontal section taken on the line 30—30 of Fig. 29.

Fig. 31 is a view in elevation, with parts broken away, of the intermediate section of the stator.

Fig. 32 is a detail in elevation of a rotor side plate.

Fig. 33 is a detail in elevation of the portion of the structure removed in Fig. 31.

Fig. 34 is a detail in cross section as seen on the line 34—34 of Fig. 31.

Fig. 39 is a perspective view of an outer cam ring.

Fig. 40 is a detail in section and elevation showing a modification of the cam ring construction.

Fig. 41 is a view in section of a portion of the rotor showing a modification thereof as it may be utilized in lower efficiency engines without auxiliary compression pistons.

Fig. 42 is a view in section taken on the line 42—42 of Fig. 41.

Fig. 43 is a detail in section showing the low grade oil feed.

Fig. 44 is a view in elevation as seen in the direction indicated by the arrow 4 in Fig. 43.

Fig. 45 is a view in elevation as seen in the direction indicated by the arrow 45 in Fig. 43.

Fig. 46 is a detail in section taken on the line 46—46 of Fig. 43.

Figure 1:
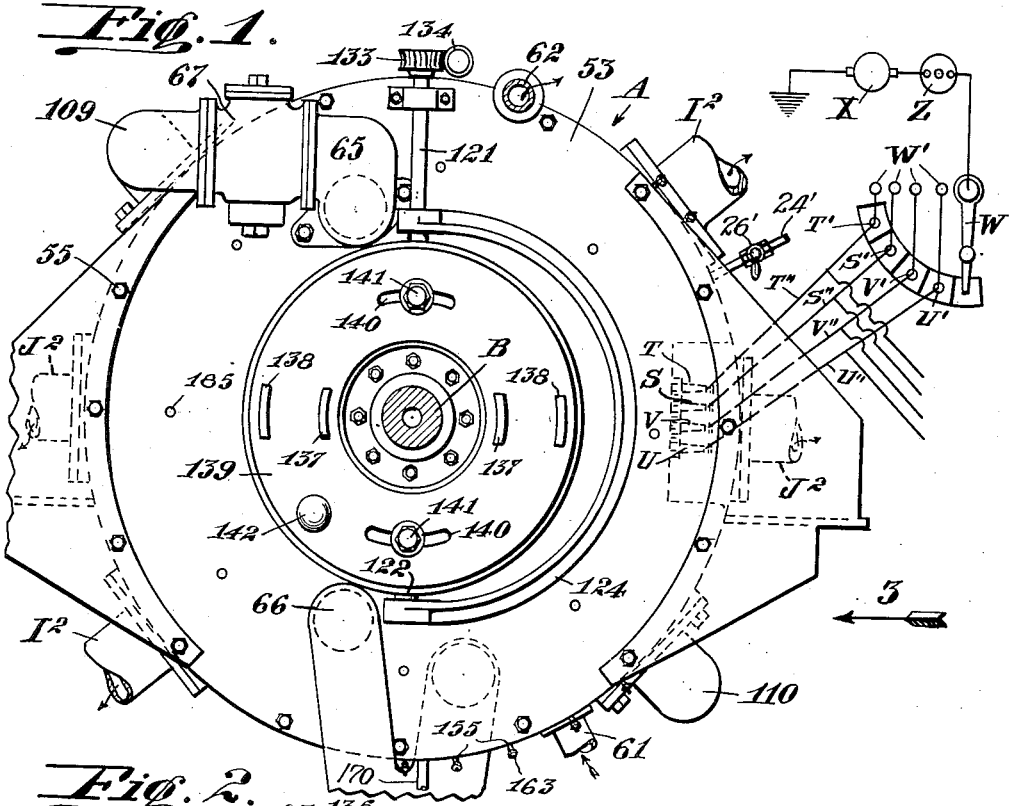
Figure 1 is a view of the motor as seen in elevation from one end thereof.

Referring to the drawings more specifically, A indicates generally the engine housing or stator, B designates a shaft journaled in the stator and extending therethrough and C and D indicate generally a pair of complementary rotors revolubly mounted within the stator and fixed relatively to the shaft B. The stator embodies an intermediate section 50 extending between the rotors, annular sections 51 and 52 which encircle the rotors and are arranged on opposite sides of the intermediate section 50, and end wall sections 53 and 54 which abut the annular portions and overlie the opposed outer side faces of the rotors. The stator sections 50, 51, 52, 53 and 54 are secured together by a series of bolts 55 which pass therethrough contiguous their outer margins. The shaft B is journaled in bearings 56 and 57 carried on the stator end wall sections 53 and 54 and is also journaled in anti-friction bearing 58 interposed between a collar 59 on the shaft B and the intermediate stator section 50. Bearing 58 takes all thrust and locates all operating parts with reference to lateral expansion. Bearings 56 and 57 are slidably mounted relatively to the stator to permit movement to compensate for variation of expansion between shaft and stator. The stator sections are each hollow to form water jackets; the section 50 being divided by a wall 60 into separated annular chambers $a$ and $b$ which are in communication with chambers $c$ and $d$ in the sections 51 and 52 through a series of passages $e$, and the chambers $c$ and $d$ are in communication through a series of passages $f$ with the water jacket chambers $g$ and $h$ in the stator end wall sections 53 and 54.

Figure 2:
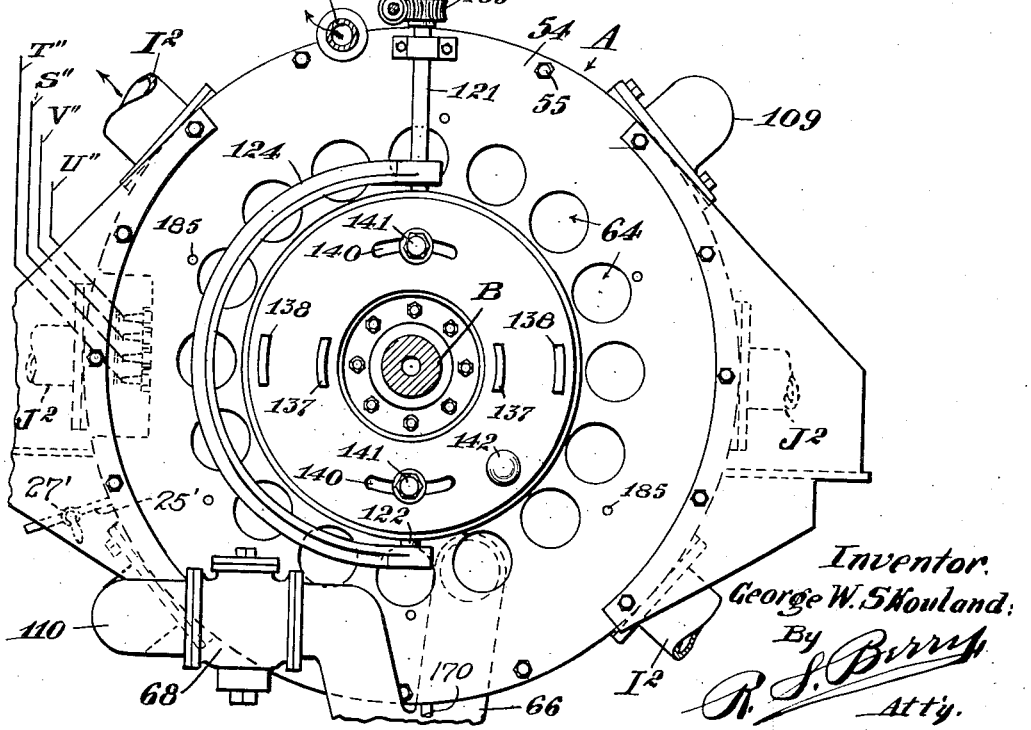
Fig. 2 is a similar view showing the other end of the motor.

A liquid cooling medium is directed to the water jacket chambers through an intake 61 shown in Fig. 3 which communicates with the chambers $a$ and $b$, and is discharged from the opposite ends of the stator through outlets 62 and 63 arranged in the upper portions thereof as shown in Figs. 1 and 2. The intakes 61 and outlets 62 and 63 may be in communication with a cooling system in the usual manner. The passages $e$ and $f$ are specially arranged to effect such distribution of the cooling medium to and from the several chambers in the stator sections as to effect such flow of the cooling medium as to be highly efficient in absorbing heat at the points of highest temperature of the engine as will be later described.

The end wall 54 is formed with a series of openings 64, the end wall 53 is formed with openings communicating with conduits 65 and 66 leading to the air intakes of carburetors 67 and 68 respectively, and the intermediate section 50 is formed with a plurality of radial air intake passages 64' whereby air drawn into the carburetors will be caused to pass through the engine for cooling purposes, and also as a means for heating the air to be intermixed with the hydrocarbon fuel employed in operating the engine; the passages 64' serving as a means for admitting cool air directly to the central portion of the engine at points between the rotors.

Figure 35:
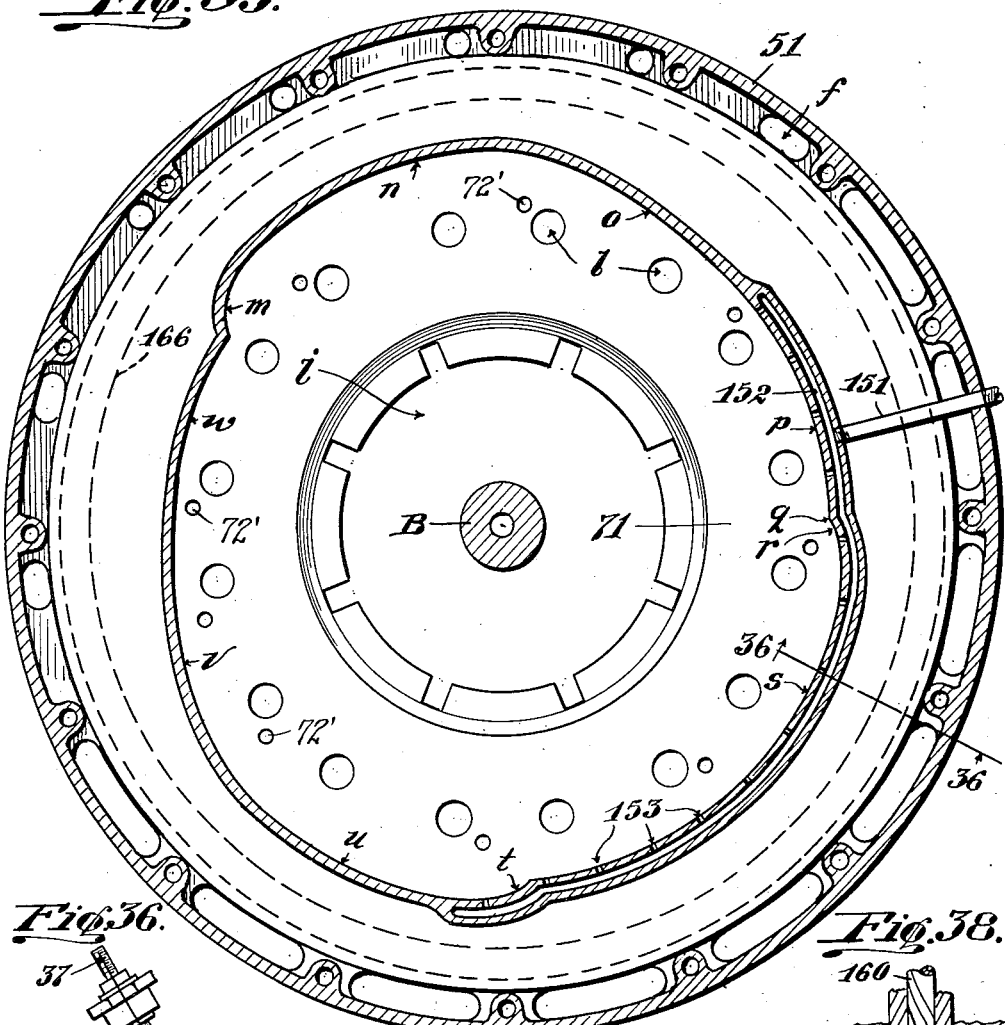
Fig. 35 is a view in section and elevation as seen on the line 35—35 of Fig. 24 with parts removed.

The rotors C and D each include an annulus 69 and affixed to the opposite sides of each annulus are inner and outer side plates 70 and 71; the side plate 70 being particularly shown in Fig. 32 and the side plate 71 being particularly shown in Fig. 35. These side plates are secured to the rotor annulus by a series of bolts 72 which are passed through openings 72' and 72'' formed in the side plates 70 and 71 and engaged with openings 72ª in the annulus 69; the bolts 72 being particularly shown in Figs. 9 and 13.

The outer marginal portions of the plates 70 and 71 project beyond the outer perimeter of the rotor annulus and their inner marginal portions are extended beyond the inner periphery of the rotor annulus; the inner plates 70 being affixed by bolts 73 to the collar 59 on the shaft B whereby the rotors are securely affixed to the shaft with each rotor annulus spaced from the latter to provide an air space E between the shaft and the rotors. The inner margins of the outer side plates 71 are spaced from the shaft B to provide openings $i$, the inner side plates 70 are provided with a series of openings $j$ and $k$, and the side plates 71 are formed with a series of openings $l$, said openings being provided to permit the flow of air through the engine and through the rotors to effect a cooling action thereon and to minimize the conduction of heat to the shaft.

A series of radially arranged slidable vanes F are mounted for reciprocable movement in radial guide slots 75 formed in each rotor annulus 69 and which slots and vanes extend throughout the width of the annulus so that the end margins of the vanes will slidably abut against the inner faces of the rotor side plates 70 and 71. The vanes are adapted to be confined substantially wholly within the slots 75 when in their retracted positions and are adapted to be advanced in the slots to projected positions beyond the outer periphery of the annulus 69 with their outer ends slidably abutted against the inner peripheries of the stator members 51 and 52 to follow the profiles of the latter, as will be later described.

Outward movement of each vane is effected by an advancing means G particularly shown in Figs. 13 and 18 which embodies a plunger 76 reciprocably mounted in a housing 77 extending radially from the shaft B; the several housings of the vane operating plungers of each rotor being interconnected and radiating from a hub 78, which encompasses the shaft B and is affixed thereto by the bolts 73 engaging the collar 59. The vane advancing means further includes a coil spring 79 which seats in a recess 80 in the upper end of the plunger 76 and bears between the plunger and a circular plate 81 slidably mounted in a guideway 82 formed in the side slots of the vane receiving slot 75; the plate 81 abutting against the inner end of the vane.

The spring 79 exerts a variable yieldable pressure between the plunger 76 and the vane according to the position and direction of movement of the vane and plungers as will be later described.

The plungers 76 are moved outwardly by means of a cam 83 acting on rollers 84 carried by the plungers and also under the urge of fluid pressure directed against the inner ends of the plungers 76; the fluid pressure operating at times independently of the cam 83 as will hereinafter be more fully described.

For the purpose of utilizing fluid pressure in effecting outward movement of the plungers 76, the latter are formed, at their inner ends, with tubular pistons 85 projecting into chambers 86 which are in open communication with an annular passage 87 formed in the hub 78 contiguous the shaft B, and the shaft B is formed with a longitudinal bore 88 communicating with a source of fluid pressure supply (not shown) whereby fluid under pressure may be delivered through the bore 88 and directed to the passage 87 through an opening 89 leading from the bore 88 and whereby all of the pistons 85 will be subjected to the action of corresponding fluid pressures tending to advance the plungers 76 in opposition to the springs 79. Retraction of the plungers 76 is effected by retraction of the vanes as the latter are moved inwardly in following the profile of the stator and through the medium of the springs 79 interposed between the vanes and plungers.

Means are provided for counteracting the action of centrifugal force on the vanes which force would normally act to force the outer ends of the vanes against the profile of the stator with undue pressure which would offer considerable frictional resistance to rotation of the rotor. This means is here shown as embodying a rocker arm 90 carried on a rock shaft 91; one end 90' of the rocker arm engaging a recess 92 in the vane and the other end being fitted with a counterweight 93. The rock shaft 91 is supported in a bearing 94 carried on one of the side walls of the vane receiving slot 75; this bearing embodying a back plate 95, particularly shown in Figs. 21 and 22, one side of which is formed with a channel 96 to receive the rock shaft 91.

The bearing also includes a plurality of outer plates 97 which are carried on the back plate 95 and have portions which extend over the rock shaft 91 as particularly shown in Fig. 19. The back plate 95 is formed with an aperture 98 through which the blade engaging end portion of the rocker arm extends and formed at the upper and lower margins of the opening 98 on the back face of the plate 95 are projections 99 which extend into corresponding recesses 100 in the wall of the slot 75 so as to form a broken joint that will serve to minimize leakage. A counterweighted rocker arm, as just described, is provided for each of the vanes on each rotor.

As a means for insuring the ends of the vanes slidably contacting the side plates of the rotors under varying conditions of expansion and contraction each of the vanes is formed of a pair of plates 101 and 102 of corresponding lengths mounted face to face for transverse movement relatively to each other. Formed on the contiguous faces of the plates 101 and 102 are recesses 103 and 104 of corresponding lengths, but slightly offset transversely of the vanes with relation to each other and disposed in the recesses is an expansion spring 105 which bears between the ends of the recesses and operates to normally advance the plates transversely in opposite directions so as to maintain the outer end of the plate 101 against one of the rotor side plates and to maintain the outer end of the other plate 102 against the other rotor side plate under yieldable pressure.

As a means for retaining the plates 101 and 102 in proper relation, pins 106 on the plate 101 are disposed to extend into grooves 107 on the plate 102. To effect a proper seal between a vane and the side walls of its receiving slot spring-pressed packing plates 108 are mounted in channels formed in the contiguous faces of the walls of the slots 75 adjacent the outer end margins thereof as shown in Figs. 13 and 18, which plates bear against the opposite faces of the vanes and extend throughout the transverse widths thereof.

While any suitable number of vanes may be employed in the rotors, eight equally spaced vanes are preferably provided in each rotor as shown; this number of vanes serving to afford proper balance and relative operation and co-action with the engine stator in effecting dual intake, compression and exhaust at diametrically opposite but offset portions of the stator as will presently appear.

Each of the stator sections 51 and 52 is provided with an intake passage H, a pair of exhaust passages I, J and a series of spark plug receiving tubes K which lead through the stator sections from the outer peripheries thereof and open to their inner peripheries; the intake and exhaust passages communicating with the interior of the stator sections through a series of diagonally arranged elongated ports H', I' and J' respectively, as particularly shown in Fig. 10. The intake passage H of the stator section 51 communicates, through pipe 109, with the delivery side of the carburetor 67, and the intake passage H of the stator section 52 communicates, through a pipe 110, with the delivery side of the carburetor 68; the exhaust passages I and J of each of the stator sections 51 and 52 connecting with exhaust pipes I² and J² leading to any suitable point of discharge.

The stator sections 51 and 52 are disposed in such relative arrangement that the intake and exhaust passages and the spark plug receiving tubes of one of the stator sections are disposed in diametrically opposite relation to the intake and exhaust passages and spark plug receiving tubes of the other stator section. The intake passage H opens to the inner periphery of the stator section at a point approximately 45° from the exhaust passage J and the latter opens to the inner periphery of the stator section about 45° from the exhaust passage I, while the group of spark plug receiving tubes K leads to the inner periphery of the stator substantially diametrically opposite the exhaust passage J and approximately 135° from the intake passage H and a corresponding distance from the exhaust passage I.

The inner peripheries of the stator sections 51 and 52 encircling the rotors are formed with corresponding contours or profiles, which profiles are particularly illustrated in Figs. 9, 10 and 12; Fig. 10 illustrating diagrammatically the profile of one of the stators as projected onto a plane.

From a point contiguous and slightly in advance of the leading side of the intake opening H the inner surface of the stator curves outwardly from a point adjacent the outer periphery of the rotor for a distance slightly in excess of the lengths of the intake openings H' as indicated at $m$ and is thence continued in spaced relation to the outer periphery of the rotor as indicated at $n$ for a distance of about 45° to form an intake chamber L, and from the portion $n$ leads on an incline for a distance of approximately 40°, as indicated at $o$, to a point contiguous the rotor and thence continues contiguous the outer periphery of the rotor, as indicated at $p$, for a distance slightly greater than the distance between a contiguous pair of vanes and to a line indicated at $q$ extending transversely of the stator about midway of the group of spark plug receiving tubes K.

The space between the surface $o$ and the rotor constitutes an initial compression chamber M. A final compression and initial combustion chamber N is afforded between the surface $p$ and the rotor by the provision of a series of recesses in the outer periphery of the rotor as will be later described. The leading end of the surface $p$ meets a surface $r$ merging into a surface $s$ extending in spaced relation to the outer periphery of the rotor for a distance substantially corresponding to the span extending between an alternate pair of vanes; the combined surfaces $r$ and $s$ projecting on an arc of approximately 90°. The space between the surface $s$ and the rotor constitutes a compound high pressure expansion chamber O and O'. The leading end of the surface $s$ connects with an inclined surface $t$ merging into a surface $u$ extending in spaced relation to the outer periphery of the rotor a distance greater than the spacing of the surface $s$ and leading a distance slightly greater than the span between a pair of adjacent vanes. The space between the surfaces $t$ and $u$ and the rotor constitute a low pressure expansion chamber P. The leading end of the surface $u$ merges into a surface $v$ which inclines toward the rotor for a distance of approximately 45° and merges into an arcuate surface $w$ extending contiguous the periphery of the rotor and leading to the curved surface $m$ at the intake passage. The space between the surface $v$ and the rotor constitutes an exhaust chamber Q at the leading and trailing ends of which are located the exhaust and scavenging ports I' and J'. The surface $w$ extending in close proximity to the rotor constitutes a barrier between the exhaust port J' and the intake port H'.

Formed in the surface $s$ is a plurality of diagonal grooves $x$ which extend from adjacent the wall surface $r$ substantially one-half the length of the surface $s$, the grooves $x$ constituting a by-pass for directing a portion of the expanded gases rearward of a vane positioned in the chamber O into the chamber forward of said vane to act also on a preceding vane during rotation of the rotor as will hereinafter be more fully described. The marginal portions of the rotor side plates project such distance beyond the outer periphery of the rotor annulus as to constitute side walls for the several chambers extending between the rotor annulus and the encircling stator section.

It will be noted that with the intake passages of the stator sections 51 and 52 arranged diametrically opposite, the several surfaces constituting the profile or contour of the inner peripheries of the stator sections, while corresponding in their order, will be located in diametrically opposite relations.

Means are provided for affording a compression space N in the outer periphery of each rotor and which may be constant or variable in capacity according to the use to which the engine is to be applied. Where it is desired that such compression space be variable in capacity especially for the use of low gravity fuel and high altitude aeronautical engines, the construction particularly shown in Figs. 9, 11, 12 and 13, and their associated views, is preferably employed, which construction embodies a series of reciprocable pistons R arranged in cylinders 111 radially arranged in the rotor annulus and opening to the outer periphery thereof; a piston R and its associated cylinder 111 being located between each contiguous pair of vanes.

The pistons R are designed to be reciprocated as the rotor revolves to vary the capacity of the several chambers formed between the rotor and stator profile; the pistons assuming various successive positions on rotation of the rotor, as illustrated in exaggeration in Fig. 12, which figure shows the movements of the pistons as might be exceedingly greater than would be employed in practice for the purpose of clearness.

Each of the pistons R embodies a head 112 arranged in and guided by the cylinder 111 which head is carried on a shell 113 extending through and guided in an opening 114 on the inner portion of the rotor annulus, and mounted on the inner end portion of the shell and projecting laterally therefrom is a stud 115 carrying a roller 116 disposed between a pair of cam rings 117 and 118, the contiguous surfaces of which cam rings are contoured to effect the desired advance and retraction of the pistons. The inner cam ring is slidably supported on a ring 119 carrying the cam 83 for actuating the vane operating plungers, which ring is affixed to the hub of the stator end wall and constitutes the portion of the hub between which and the shaft B the antifriction bearings 56 and 57 are interposed. The outer cam ring 118 is slidably supported in an annular guideway 120 formed on the inner face of the hub portion of the stator end wall.

Where it is desired to vary the zone of the stroke of the pistons R to vary the capacities of the several chambers controlled thereby according to requirements the contiguous profiled faces of the cam rings 117 and 118 are inclined in opposite directions, and means are provided for simultaneously shifting the cam rings in opposite directions longitudinally of the shaft B so as to bring the points of contact between the rollers 116 and the cams closer to or farther away from the axis of the shaft B. This means is here shown in Figs. 3 to 8 inclusive as including a pair of aligned rock shafts 121 and 122 mounted in the hub of the stator end walls and extending thereinto from diametrically opposite sides of the shaft B, which rock shafts are connected together to turn in unison by a yoke 124. Mounted on each of the rock shafts is a pair of eccentrics 125 and 126 which engage eccentric straps 127 and 128 respectively connected with rollers 129 and 130 located in channels 131 and 132 formed in the outer side faces of the cam rings 117 and 118 whereby, on turning the rock shafts 121 and 122, the cam rings 117 and 118 will be shifted horizontally in opposite directions. Complementary pairs of cam rings, and their operating parts, are provided at each end of the engine for actuating the pistons R on each rotor, and as a means for simultaneously operating both pairs of the cam rings, the rock shafts 121 are provided with worm wheels 133 which mesh with a pair of worms 134 and 135 on an operating shaft 136, particularly shown in Fig. 3.

Where it is not desired to vary the zone of travel of the pistons R, the cam rings 117' and 118' may be formed with their working faces parallel as shown in Fig. 40 and in which instance the cam rings may be mounted for only circumferential movement and, in this event, the cam ring shifting mechanism just described may be dispensed with.

As a means for varying the timing of the movements of the pistons R, the cam rings 117 and 118 are collectively adjustable circumferentially and for this purpose each of the cam rings is provided with a pair of studs 137 and 138 respectively which project from the outer faces of the cam rings through slots in the stator end walls and are engaged by a ring 139 turnably carried on the stator end wall; each ring being provided with a pair of slots 140 through which stud bolts 141 are screwed into engagement with the stator end wall. These bolts 141 are operable to clamp the rings 139 against movement and thereby hold the cam rings against circumferential movement, but on loosening the bolts, the ring 139 may be turned, as by means of a handle 142, to effect turning of the cam rings to the desired position.

In order to accommodate the pistons R and the counterweights 93, the shells of the former are formed with open sides into which the counterweights project as shown in Fig. 17. As a means for limiting outward movement of the pistons, studs $y$ carried on the rotor side plates are extended into slots $z$ in the pistons as shown in Figs. 13 and 16; this construction preventing the pistons being projected beyond the outer periphery of the rotor in event of the pistons becoming freed by any cause.

Where it is desired to provide the rotors with peripheral recesses of unvarying capacity for low duty high gravity fuel engines the pistons R and their operating mechanism may be dispensed with and, in which event, the outer periphery of the rotor annulus will be formed with a recess 143 extending a suitable distance between contiguous pairs of vanes as shown in Figs. 41 and 42.

As a means for effecting ignition of a compressed explosive charge, a group of spark-plugs 150 of any suitable number are mounted in the group of tubes K, being disposed at such points and in such arrangement as to afford a plurality of sparking points at and contiguous to the leading end portion of the initial expansion chamber O. The group of spark-plugs is here shown as four in number arranged in staggered progression circumferentially of the stator as illustrated in Figs. 3 and 45; being designated at S, T, U and V. The spark-plugs S and T have their spark gaps located near openings $S^1$ and $T^1$ leading to the explosion chamber N. The spark-plug U is arranged with its spark gap near an opening $U^1$ at the leading end of the chamber O, and the spark-plug V is arranged with its spark gap near an opening $V^1$ communicating with the leading end portion of the chamber O. Any other desired grouping of the spark-plugs may obviously be employed; the essential feature being the provision of a series of spaced sparking points in the ignition and initial expansion chambers to provide a means for varying the timing of the ignition by placing either one or more of the spark-plugs in or out of operation which may be accomplished in a conventional manner; the spark-plugs being fitted with conductors S'', T'', U'' and V'' leading from any suitable source of electrical supply.

As a means for enabling operation of the motor at high speeds, the spark-plugs are operated to produce a multiplicity of sparks while the electrical circuit thereto is closed. The actual timing of the action of the spark upon the compressed charge is effected by the position of the vane F in passing the opening exposing the spark gap of the spark-plug in circuit and hence the spark itself need not be timed.

As a means for affording lubrication of some of the operating parts of the engine and to provide the necessary oil seal between the contiguous surfaces of relatively movable parts to inhibit leakage of gases and obviate loss of pressure from the chambers interposed between the rotor annulus and the stator sections, a suitable lubricating oil is initially delivered through feed pipes 151, one of which is particularly shown in Fig. 35, from a suitable source of oil supply under pressure; mechanism, not necessary to be here shown, being employed for feeding the lubricant in regulated quantities according to the speed of operation of the engine.

Figure 36:
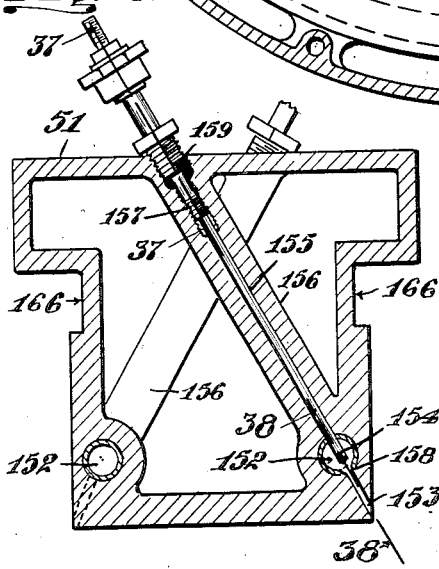
Fig. 36 is a view in cross section as seen on the line 36—36 of Fig. 35.

The lubricating oil is initially delivered to the inner faces of the rotor side plates 70 and 71 at intervals along the side margins of the inner peripheries of the stator sections 51 and 52 throughout the portion of the length of the stator profile commencing in the profile surface o adjacent the leading end thereof and continuing along the profile surfaces p, q, r, s and t and terminating at the leading end of the surface u. As a means for effecting delivery of the lubricating oil to the rotor side plates each of the stator sections 51 and 52 is formed with a conduit 152 adjacent each side margin of its inner periphery, as particularly shown in Figs. 35 and 36, which conduits extend contiguous the profile surfaces above mentioned and from which a series of outlets 153 lead to the inner faces of the rotor side plates. The lubricant feed pipes 151 connect with the conduits 152 adjacent the upper end portions thereof.

Figure 37:
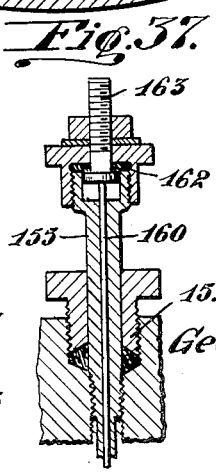
Fig. 37 is a detail in section taken on the line 37—37 of Fig. 36.

Means operable from the exterior of the engine are provided for regulating the feed of lubricant through each of the outlets 153 together with means for enabling cleaning of the outlets. This means is particularly shown in Figs. 36, 37 and 38 and is here shown as embodying a valve 154 formed on a tubular stem 155 extending through a web 156 formed in the stator section and having threaded engagement with the web, as indicated at 157, whereby turning of the valve stem will effect movement of the valve 154 relatively to a valve seat 158 formed at the inner margin of the oil outlet 153. The outer end of the valve stem 155 projects exteriorly of the stator section through a packing gland 159.

Figure 38:
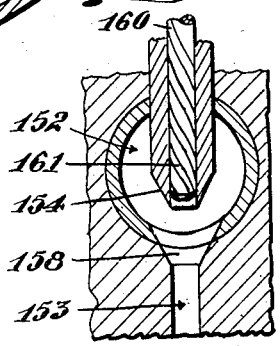
Fig. 38 is a detail section taken on the line 38—38 of Fig. 36.

Extending through the tubular valve stem is a rod 160, the inner end portion of which is spirally grooved to form a drill 161, as indicated in Fig. 38; the outer end of the rod 160 projecting through a packing gland 162 on the outer end of the valve stem 155 and being threaded at 163 for engagement with a suitable tool whereby the drill 161 may be projected through the valve 154 and introduced into the outlet 153 to effect cleaning of the latter.

The oil is thus delivered to the rotor side plates where the latter extend adjacent the side faces of the stator sections 51 and 52 at the points of greatest pressure of the gaseous charge induced in the engine, so as to form an oil seal to prevent leakage of the gases under pressure between the rotor side plates and the stator sections. Thorough distribution of the lubricant throughout the contiguous surfaces of the rotor side plates and stator sections will be effected on rotation of the rotors.

Formed on the outer peripheries of each of the rotor side plates is a marginal rim 165 which projects from each side of the rotor side plate and extends into an annular groove 166 formed in each of the stator sections.

The outer faces of the rotor side plates are overlapped by wall portions 167 (see Fig. 31) of contiguous stator sections extending along the inner margins of the grooves 166; the inner margins of which wall portions are contoured to accord with the profiles of the inner peripheries of the stator sections 51 and 52 so that the overlap of the rotor side plates by the stator sections will be equal although varying in extent at different points throughout the marginal portions of the side plates.

A clearance space is provided between the outer faces of the rotor side plates and the overlapping portions of the stator sections and between the faces of the marginal rims 165 and the walls of the annular grooves 166, so as to form U-shaped passages 186 in open communication around the over-lapped marginal portions of the rotor side plates; the clearances being sufficient to permit oil to flow thereinto to fill the clearance space and thereby provide an effective oil seal between the rotors and stator sections; this construction serving the two-fold purpose of obviating frictional contact between the rotor side plates and the stator sections and providing a space in which an oil film under high pressure may be utilized instead of a mechanical friction seal to eliminate leaks of expansive pressures around the margins of the rotor side plates. At low speeds of rotation of the rotors the oil initially delivered to the inner faces of the rotor side plates through outlets 153 regardless of its pressure is urged outwardly along the inner faces of the rotor side plates by the expanding fuel pressures developed between the outer peripheries of the rotors and the profiled inner peripheries of the stator sections 51 and 52 which flow of the oil is further augumented by the action of centrifugal force. The lubricating oil is thus conveyed around the marginal rims 165 and will be forced inwardly along the outer faces of the rotor side plates so as to be directed into the spaces interiorly of the engine to provide lubrication for the movable parts therein. By constantly replenishing under high pressure the supply of oil between the rotor side plates and the stator sections, through outlets 153, the sealing space or passage 186 is kept constantly filled and the fresh oil, by reason of its greater density and viscosity will better resist leakage of gases from the rotor chambers.

Development of the liquid seal above described which operates entirely without metal to metal contact between the relatively moving parts of the engine overcomes one of the most difficult problems in rotary structures. Due to relatively large diameters and high surface speeds the friction developed by metal to metal contact is so great that destruction of the surfaces in contact is so rapid as to preclude any extended period of operation.

The liquid seal in my engine entirely obviates this destruction and completely eliminates friction except the shear friction in the interposed oil film which is relatively of little consequence. The combination of facilities for introducing oil under externally regulated pressure and volume during low speed operation and the utilization of the extended portions of the rotor side plates as centrifugal pump runners during high speed operation provides complete flexibility in control of the volume of oil or other sealing liquid according to the needs of the engine.

The U-shaped annular chamber between the rotor annulus and the end sections operates as a centrifugal pump shell without discharge outlets in which the pressure generated by the side plates operating as runners will build up in the extreme inner peripheral space to the full extent of the capacity of the runners to generate pressure at any speed at which the engine is operating.

The pressure at any point of less diameter than the outer flange on the runners on both side faces will be equal, and the urge to flow along the side faces of the runners due to centrifugal action will be equal at any speed. The liquid on both side faces of the side plates being under constant urge to reach the periphery of the side plates.

If any foreign pressure be induced against the oil film on either face of the side plate and in contact with the stationary portion of the stator the urge of centrifugal action on the film on the opposite face of the side plate will resist the effort of the foreign pressure to displace the liquid in the peripheral chamber, which resistance in turn is communicated to the film being acted upon by the foreign pressure.

With the peripheral pressure maintained either by the effect of the side plates as pump runners or by the delivery under pressure from the outside sources or a combination of both, the continuity of the liquid film on the side of the plates in relation to the pressure chambers of the engine is assured. If the relatively slight space between the side plates and the annulus of the stator is completely occupied by the liquid film it follows that any body of gas seeking escape from the pressure chambers cannot occupy this space at the same time. The space between the side plates and the stators being the most important path of escape of the gases it follows that if the gases cannot displace the liquid they cannot escape.

Profiling both the stator annulus and the inner surfaces of the stator end sections to the relative depths to assure a balancing of the pressure on both side faces of the side plates minimizes the hazard of the sealing liquid flowing into the the operating chambers of the engine in which pressures are low or in which vacuum exists.

The oil delivered from the upper portions of the rotor side plates drains down over the shaft and bearings to the lower internal portion of the engine and will be conveyed through the clearance spaces between the outer faces of the rotor side plates and the contiguous stator sections into oil receptacles 168 from whence surplus oil will be carried off by scavenge drains 169 provided in the lower portions of the central stator section 50 and the end stator sections 53 and 54; the drain in the central stator section being particularly shown in Fig. 34. The oil receptacles 168, particularly shown in Figs. 33 and 34, are formed by deepening the grooves 156 in the central stator section 50 and in the stator end sections 53 and 54. The drain 169 leads from the receptacle 168 adjacent one end thereof at a point above the lower central portion of the receptacle whereby the latter will normally contain a volume of oil. The drains 169 communicate with pipes 170 leading to a circulating pump, not shown, or other suitable point of discharge. The receptacle 168 serves as a means for insuring rapid distribution of the lubricant throughout the engine on initial starting thereof, as well as to afford a means for collecting such lubricant as may drain from the stator and rotors when the latter are stationary; it being evident that on starting the engine a film of oil will be immediately deposited on the outer surfaces of the rotor side plates from the receptacles 168 so that these surfaces at the important sealing points will be completely coated on a single revolution of the rotors.

During rotation of the rotors at high speeds, the side plates thereof will act as centrifugal pump runners and will act to force the lubricating oil outwardly on both sides of the outer portions of the rotor side plates into the clearance spaces 186 at the outer peripheries of the side plates and thereby building up in clearance space 186 pressures on the oil which being communicated to the oil film filling the clearance spaces at the sides of the rotor side plates will equal or exceed the internal gas pressures, and at such times the coordinated profiles of the inner and outer stator sections will prevent overflow of oil to the operating chambers. At such times the feeding of new oil will be greatly reduced and due to the pressure generated in the overflow scavenge connections the reversal of flow will deliver oil to the spaces between the rotors and stators for the effective lubrication of the cams and bearings. Effective distribution of the lubricant delivered to the interior of the engine from the rotor side plates is effected by reason of the action thereon of the air stream flowing through the interior of the engine and through the openings in the rotor side plates in such manner as to form an oil mist which will so completely fill the air spaces interiorly of the engine as to afford thorough lubrication of the relatively movable parts.

In order to effect adequate cooling of the engine cold water is delivered into the lower portion of the water jacket through the intake pipe 61; it being delivered into the chambers $a$ and $b$ formed on opposite sides of the wall 60 in the central stator section 50 and thence being directed laterally from the chambers $a$ and $b$ into chambers $c$ and $d$ through the apertures $e$ which are located at various points along the side walls of the stator sections in such manner as to allow entrance of the cool water into the stator sections 51 and 52 at points where the incoming stream will be most effective and is most needed.

For this purpose a series of the apertures $e$, of large area, are arranged to lead into the chamber $c$ and $d$ where the latter extend rearward of the profiled surfaces $p$, $q$, $r$, $s$, $t$ and $u$ which are located at the zones of highest temperatures developed in the engine, as particularly shown in Figs. 9 and 35; the apertures $e$ being of reduced area where they communicate with the chambers $c$ and $d$ in the portions of the stator sections adjacent the intake passages $h$ and chambers $c$.

As a means for enabling operation of the engine at the will of the operator by the employment of either high or low gravity fuel, the engine is equipped with a low gravity fuel feed, particularly shown in Figs. 43 and 46, adapted to be placed in and out of operation as occasion may require and which is here shown as embodying a fuel feed supply pipe 175 leading from a suitable source of fuel supply and communicating with a fuel feed passage 176, as shown in Fig. 46, formed in each of the stator sections 51 and 52; the passage 176 leading to a valve chamber 177 from which leads a series of discharge ducts 178 opening to the profiled inner periphery of the stator section at points located in the ignition zone of the group of spark plugs, as shown in Fig. 45, whereby the low gravity fuel will be delivered into the engine at the point of highest compression. It will be understood that when low gravity fuel is delivered to the engine, it will be fed thereto under pressure and that, in this instance, ignition may be effected by the flash principle, in which event, the spark plug ignition would not be employed.

By employment of the pistons R, a quick compression of the explosive charge may be effected, and by adjustment of the piston operating cams the moment of the peak of compression by action of the pistons may be varied and predetermined so as to render possible such timing of the compression of the charge as to effect flash ignition with any grade of fuel.

As a means for placing the low gravity fuel feed in and out of operation, a valve 179 is arranged in the valve chamber 177 and is operable to close communication between the passage 176 and ducts 178; the valve being mounted on a stem 180 extending exteriorly of the stator section through a packing gland 181 and having a screw threaded mounting as indicated at 182 whereby, on rotation of the stem 180, the valve 179 may be advanced or retracted either to cut off or to regulate the flow of the fuel supply to the engine. When the engine is operated by low gravity fuel the necessary air for admixture with the fuel will be supplied through the carburetors and through the intakes H; the air being drawn into the engine by the successive advancing vanes and being compressed before it is brought to the zone of admixture with the low gravity fuel.

In the operation of the invention, when employing a high gravity fuel, the fuel is delivered to the carburetors in the usual manner and on initial rotation of the rotor, the rotor vanes successively traversing the intake chambers L of the engine will create a partial vacuum rearward of each vane so as to induct into the intake chambers rearward of the projecting portion of the rotor vanes charges of the carbureted fuel which is drawn from the carburetors 67 and 68 and comprises hydro-carbon vapors or gas intermixed with air, the fuel being fed to the carburetors in the usual manner and the air constituent being drawn through the air intakes and passages leading through the engine as before described.

Fuel charges will thus be interposed between successive pairs of rotor vanes as they traverse the intake chambers L, which charges will be compressed as the vanes traverse the compression chambers M, and will be ignited while under a high state of compression when traversing the combustion chamber N by sparks emanating from the spark-plugs as before described. The resultant expansion of the combusted fuel charges exerts force upon the exposed areas of the protruding ends of the rotor vanes successively entering and traversing the initial, intermediate and final expansion chambers O, O' and P, thus impelling the rotor. The initial application of force occurs as the vanes move outwardly in traversing the arcuate wall q so that the full force of the initial expansion of the energy of the fuel charge is imparted to the leading vane for a short period, that is, from the moment of initial expansion of the charge until the vane advances beyond the leading ends of the grooves X in chamber O. When the initial expansion due to the ignition of each succeeding new charge occurs, the gases of the previous charge, due to the rotation of the rotor and consequent employment of the capacity of the chambers O and O' have expanded to such extent that the residual pressure in the chamber forward of the vane leading the new impulse is much lower than the initial pressure impelling the vane. In an engine designed to obtain maximum efficiency, the residual pressure would be about one-third or less the expansion pressure of the new charge. The early expansion of the new charge exerts force on the vane leading it due to the fact that the area of exposure of this vane is materially greater than the area of exposure of the follower vane traversing chamber N and due to the fact that the gases are confined in all other directions. The early expansion force of the new charge exerted upon the vane leading it, as the vane traverses the arcuate wall q imparts an instantaneous increase in speed to the rotor through the medium of this vane until the vane advances beyond the leading ends of the grooves X in chamber O. It is at this point that an important feature of my engine is demonstrated, that is, the portion of the development, that makes possible in a multi-vane engine of great flexibility, the utilization of the same period in time for ignition, flame propagation, combustion and expansion, that is available in a two vane rotary engine or a reciprocating engine operating at the same speed. This is accomplished in a manner that also practically eliminates retrogressive pressure on the vanes for 90 degrees of shaft rotation and reduces to the minimum the retrogressive pressure during the entire power stroke equivalent. While it is assumed generally that the expansion due to ignition and combustion of a charge of combustible gas is instantaneous, when rigidly defined the term instantaneous varies broadly in degree. In a rotary engine, with vanes spaced at 45 degrees, operating at 3000 R. P. M. the distance between vanes is traversed by the rotor in one four hundredth of a second. This is one-fourth of the time required for the power stroke of the piston in a reciprocating engine operating at the same speed. The time is about one-fifth of the time alloted to ignition, flame propagation, combustion and expansion in a reciprocating engine from the moment of occurrence of advanced spark to the completion of the power stroke. Combustion and expansion cannot be completed in so brief a period. In a multi-vane engine with vanes spaced 45 degrees or less, if effort be made to complete the power stroke equivalent of the cycle with maximum vane exposure in the distance between a pair of vanes most of the energy of the expanding fuel would be expended in the exhaust manifold. If in the same engine, effort be made to lengthen the time period for combustion and expansion by trapping the expanding charge between pairs of vanes for longer traverse the value of the progressive increase in vane exposure is impaired due to the effective work area of the leading vane being offset by the increased exposure of negative work area of the follower vane. In my engine by means of the grooves X in chamber O in combination with the operation of the vanes and pistons R, I develop an operating condition under which I obtain the same period for ignition, flame propagation, combustion and expansion, obtained in the reciprocating engine at like speed, material reduction of negative area of follower vane for ninety degrees of rotation of rotor, and employ the maximum useful work area of vane exposure during the whole power stroke equivalent.

Reverting to the operation, as the vane leading the new impulse enters the zone of the grooves X in chamber O: The pressure differential on opposite sides of the vane leading the new charge exists while this vane is traversing the grooves in chambr O; the grooves being of such cross-sectional area as to permit a flow of gas but not to produce the effect of an open dump, which would have the effect of retarding combustion through permitting too rapid a drop in pressure in the gases composing the new charge, even though the gases flowing through the grooves X immediately contact the flame remaining in the gases in the chamber forward of the vane traversing the grooves X. Such flow of gases over and beyond the vane behind which the new impulse occurred is possible, because as stated, the pressure of the gases remaining in the leading chamber from the previous expansion has been materially reduced relatively to the pressure of the new charge. The force of the pressure of the gases from the new charge, in the process of passing through the grooves X performs work upon the exposed area of the vane over which they are passing to the extent that the pressure rearward of the vane over which they are passing produces velocity in the body of the gases by reason of it being higher than the pressure in the chamber forward of the vane, thus giving up some useful work in the form of kinetic energy. This structure is not to be confused with barred ports in rotary steam engines through which steam enters over a vane producing a balancing of pressure on both sides of such vane as soon as it enters the zone of port opening. The vanes of my engine in traversing the zone of the grooves X do not come into a zone of balanced pressure until they reach the trailing end of the grooves X. Control of the rate of flow and consequent pressure drop is important. It must be remembered, as heretofore stated, that in the 45 degrees of shaft rotation represented by the length of chamber O, which at 3000 R. P. M. represents one four hundredth of a second occur the processes of ignition, flame propagation and combustion. A considerable portion of this period is legitimately comparable with the period of lead ahead of top center in a reciprocating engine that is given by the advance of the spark in order that the maximum expansion value of the combusted charge may begin to apply force to the piston most effectively as it goes over center on the power stroke. The difference here being that this period in a reciprocating engine is the slow moving period of piston travel in which the time element per degree of shaft rotation is greatest. In the rotary engine every degree of rotation is accomplished at the same speed as in a reciprocating engine at middle center. Restriction of the groove area, especially in the leading end of the chamber O is necessary in order that the compression pressure may not be lost during the period of combustion. The progressive advance of the compression pistons R, which occurs during this period as elsewhere more fully described serves to maintain this compression pressure just as the piston of the reciprocating engine continues to build up compression pressure after the spark has occurred and during the period of flame propagation and combustion before expansion has progressed sufficiently to produce retrogressive movement in the piston. The work done by my compression pistons at this time presents a minimum demand in negative work because expansion has not yet developed high resistance to piston advance. After passing through the grooves and over the leading vane, the expanding gases of the new charge merge with the gases of the previous charge remaining in the chamber forward of the vane after the next preceding vane cut off communication between chambers O and O'. This serves in combination with the displacement of the combustion chamber capacity by the advance of piston R to increase the pressure exerting force resulting from the expansion of the gases upon the next leading vane as it traverses the portion s of the stator profile extending between the grooves x and the incline t and also a portion of the incline t which constitutes a wall portion of the chamber O'. At the moment of establishing communication between chambers N, O, and O' due to the vane uncovering the leading end of the grooves X the operation of my engine brings into contact two separate and distinct bodies of gases both in process of combustion as follows: The residue of the preceding charge in the trailing end of chamber O and the leading end of chamber O' and the newly ignited charge in the trailing end of chamber N and the leading end of chamber O. The capacity of chamber N at the moment of ignition has disappeared as an operating factor due to the advance of piston R hence there is no dissipation of pressure due to dual chamber capacity. Actual pressures involved will vary according to the initial compression pressure factor being used at the moment as determined by the manually operated stroke control setting of the mechanism actuating pistons R. The value of the pressure in the residue charge is the terminal pressure of the previous charge at the moment that the vane closed communication via the grooves between chambers O and O' and before the beginning of the final expansion stage in chamber P, say from 100 to 300 pounds per square inch. The value of the pressure of the newly ignited and partly combusted charge at the time of opening communication via the grooves is say from 200 to 400 pounds per square inch depending on the initial compression pressure setting. This initial pressure will build up to 500 to 900 pounds per square inch as combustion progresses if chamber capacity could be held stationary, but functions at proportionate value as the chamber capacity increases due to the travel of the vanes with the rotation of the rotor. At the peak value of the pressure I have in the operation practically the situation that would exist if I had a pair of stationary cylinders of equal capacity, containing fluid, one compressed to 100 to 200 pounds per square inch and the other to 500 to 900 pounds with facilities to establish instantaneous communication between the cylinders and means for forcing the contents of one cylinder into the other as is in effect accomplished by my piston R. With all of the fluid forced into the one cylinder there would be present there both volumes of fluid under pressure equal to the sum of the two separate pressures say from 600 to 1100 pounds per square inch. If the pressure of the two merged volumes were to exert force on a piston moving a fixed distance against a given load it is quite obvious that it would yield more work than either of the pressures in the individual cylinders moving the piston the same distance against the same load. I will assume that the pressure of from 500 to 900 pounds per square inch is the maximum pressure that can be had from the expansion of a single charge of fuel. Obviously a pressure of from 600 to 1100 pounds per square inch functioning in a chamber of the same capacity and expanding to the same extent will yield more useful work than the lower pressure. In my engine each fuel charge does two stages of work in chambers O and O' and two kinds of work. The apparently paradoxical situation of having the pressure and using it in part twice develops from the work done by the piston R at the time when minimum pressure permits the work to be accomplished with a minimum of negative effort in combination with the effect of the grooves X. After the work is accomplished in chambers O and O' the merged charges compounded finally do work on a single vane in chamber P. During the period of operation through chambers O and O' all the work has been done against the total area of the two vanes worked on to the extent that part of the work is done through employment of kinetic energy and part by employment of potential energy. There has been a minimum of loss due to retrogressive work on follower vane. It must be clearly borne in mind that there is no balancing of pressure on the vane traversing the grooves X until at the instant it reaches the trailing end of the grooves and cuts off communication between chambers O and O'. By means of the structure in the grooves X as stated I provide for the period of ignition, flame propagation and combustion, which occurs in chamber O apart from the expansion of the gases, the same time element that would be available for ignition, flame propagation, combustion and complete expansion in a multi-vane rotary engine in single stage and without the structure that I provide in chamber O. I provide further for a very gradual acceleration outward radially of the vane leading the burning new charge, so there will be no difficulty in its being maintained in contact with the face of the stator. Then in chamber O' I provide for the employment of the work force of the combined and merged and thus compounded expansion, during the full period of 45 degrees of rotation represented by the full distance between two vanes upon the maximum possible vane area exposure without violent change of direction radially of the vane hence with minimum hazard of loss of pressure due to loss of vane bearing upon the inner surface of the stator. Thus the work force of the combined, merged or compounded expansive impulses has been employed, without material reduction in loss due to negative work upon an exposed follower vane, for a period measured either in time or degrees of rotation of shaft, which is double the time or number of degrees of rotation that could be obtained without loss due to retrogressive effort upon a considerable exposure of vane in any eight or other multivane structure in single stage. Due to the displacement of the compression chamber space by the compression pistons, in combination with the effect from the grooves X, I have gained for useful work the materially increased pressure obtained in merging or compounding of the combinde expansive impulses that could by no means be obtained from the combustion and expansion of separate new charges each of the same volume as I employ. The preceding vane after traversing the chambers O and O' rides outwardly over the arcuate surface $u$ and thereby presents an increased area to the expanding gases, which because of the great enlargement of the expansion chamber at this point will permit further expansion of the gases. This increased expansion combined with the increased area of the vanes presented thereto will impart further propulsive force to the rotor. This final expansion occurring in chamber P delivers useful work force upon the materially greater vane area with the same ratio of loss due to negative work on the follower vane that would have occurred in the preceding stages without the structure I provide in the grooves X, but does its work with materially increased efficiency due to the merging or compounding of the expansive force owing to the fact that there is available for useful work through this final expansion stage a materially greater volume of gases than would be available from a single impulse trapped between two vanes for the full period from time of ignition to exhaust. Thus the effect of merging or compounding is reflected through the whole cycle. The structure embraced in chambers O and O' thus serves several useful purposes, first it makes possible an adequate time period of combustion and expansion making the gases do useful work in the engine instead of expanding in the exhaust manifold, second in combination with the pistons R in building up a greater volume of gases under higher pressure for useful work upon each successive vane than could be provided in any extended expansion of individual charges, third due to the fact that a new fuel mixture comes into the engine at each 45 degrees, but burns in an openly communicating body through the rotation in 90 degrees a higher temperature and a more efficient function of expansion is maintained in the final expansion stage than would be the case with individual charges trapped between separate pairs of vanes. It will now be seen that the driving of the rotor will be accomplished by the combined, merged, compounded or multi-stage expansion of the combusted gases and that thereby the greatest possible percentage of the theoretical energy of the fuel will be utilized before being exhausted.

Due to the fact that effective work in a rotary engine results from the application of the maximum possible force to the maximum effective vane area proportioning of chambers, vanes, pressures and other features are of vastly greater importance than in a reciprocating engine. In a reciprocating engine piston area is a fixed quantity. Proportioning stroke length and timing assures efficient expansion of the fuel against the fixed piston area. The volume of work available from a given quantity of fuel is easily established. In a rotary engine it is quite possible to obtain the most complete expansion of the fuel without measurable return in useful work. In carrying the invention into effect, relative chamber capacities will vary according to the specific duty for which each engine is designed but the fundamental principles involved will be as herein disclosed. Generally the relationship in capacity of chamber N to chamber L will be determined by the duty of the engine being developed within the practical range of compression control provided by the mechanism actuating the pistons R. The relationship of the capacity of chamber O to chamber N will be determined by the speed of operation and the character of fuel employed. Always this relative capacity is determined by the pressure necessary to be retained during combustion to insure complete combustion of the fuel. The relationship of the capacity of chamber O' to chambers O and P in turn is determined by the speed of operation and the character of fuel employed in order that the work done between chambers O and P will result in complete expansion of the fuel before exhaust. Within reasonable limits the proportioning of the chambers for any duty of engine is effected in part by the pistons R as shown in Fig. 12.

After affecting the compression of the fuel the piston continues to advance during the period of combustion and initial expansion in chamber O until it completely displaces the capacity of the final compression and initial combustion chamber N in the rotor. As a result of this reduction of capacity of the chambers in which expansion occurs, the pressure resulting from the expansion necessarily attains a materially higher value than would be attained if the expansion occurred in a chamber of larger capacity. The pressure increase thus produced necessarily results in a material increase in the amount of work done on the vanes subjected to this pressure in chambers O and O' under the initial and intermediate expansion and due to the fact that the reduced chamber capacity is sustained the same benefit continues in the final expansion in chamber P. It must be remembered that the capacity of the intake chamber L is not reduced in the process of controlling the capacity of the compression and expansion chambers. The effect of the advance of the pistons is most important when the engine is being operated at low compression ratios as is possible due to the variable compression feature. Then the initial compression space is of relatively large capacity and the advance of the piston displaces a greater capacity in the expansion chambers than at high compression ratios when the efficiency is higher without the effect of the piston. By employing the recessed compression chamber in the rotor between contiguous vanes, and operating the engine with just running clearance between the rotor and stator in the segment identified as chamber N I obtain practically complete elimination of negative work on the vane traversing this segment.

Scavenging of the combusted charge is effected as the vanes traverse the chambers P and Q; a portion of the charge being exhausted through the exhaust passage I on the latter being placed in communication with the expansion chamber P which occurs as an advancing vane moves over the leading margins of the exhaust opening I', as shown in Fig. 9, and which occurs as the next following vane enters the expansion chamber P so that the following vane will expel the expanded gases in front thereof while the vane is in its fully advanced position. Final and complete scavenging of the gases is effected through the exhaust passage J which is spaced from the exhaust passage I a distance less than the span between contiguous vanes so that as a vane passes the exhaust I and is then moving to its retracted position the gases in front thereof will be expelled through the exhaust passage J. By the provision of the double exhaust negative pressure is reduced to a minimum and complete scavenge of the burnt gas is made possible.

As the vanes traverse the inwardly inclined surface $d$ they are forced inwardly by the latter to their initial retracted position.

During rotation of the rotors, centrifugal force, acting on the weights 93 tends to move the latter outwardly, and through the medium of the lever arms 92 tends to move the vanes inwardly, and it is therefore contemplated to so proportion each weight 93 and its leverage connection with a vane to the weight and frictional opposition to radial movement of the vane and its associated plunger 76 and parts as to offset the action of centrifugal force tending to radially advance the vanes. In this manner centrifugal force is utilized to the extent necessary to counter-balance the tendency of the vanes and plungers to radially advance under the urge of the same force.

Then by providing mechanical means for effecting outward movement of the vanes, in opposition to the action of the counterweights the pressure of the vanes against the stator profile may be rendered such as is only necessary to afford a proper seal, so as to reduce frictional resistance and wear to a minimum.

Outward movement of the vanes, whereby their outer ends are maintained in contact with the stator profiles is insured by the action of the stationary cams 83 on the plungers 76; these cams being profiled (see Fig. 9) with ascending and descending planes so arranged relatively to the stator profiles as to permit the vanes being fully retracted by the latter, and so as to effect advance of the plungers 76 as the rollers 84 thereon traverse the cams to cause the vanes to follow the outwardly inclined and projected contours of the stator profiles. As a roller 84 advances on an ascending plane of a cam 83, the associated plunger 76 is moved outwardly, and through the medium of the spring 79 interposed between the plunger and the inner end of the vane, exerts a yieldable pressure on the latter so as to force the vane outwardly to cause its outer end to contact the stator profile. The spring 79 is under tension at all times so as to always exert a yielding variable pressure between the plunger and the inner end of the vane irrespective of the position of the vane with relation to its operating plunger, or in its movement radially of the rotor; the spring being so tensioned as to urge the vane outwardly in opposition to the action of the counterweight 93, and to maintain the vane against the stator profile under the desired pressure.

The vane and its associated plunger being movable independent of each other permits the interposed spring 79 being placed under various states of compression at different points in its travel over the stator profile; the plunger being advanced relatively to the vane to place the spring 79 under maximum compression when the vane is in its fully retracted position and about to enter the compression chamber and the initial expansion chamber and also when the vane is in a partly projected position and about to move to its fully projected position on entering the second expansion chamber, so as to insure instant projection of the vane under the urge of the spring as the vane advances into the intake and successive expansion chambers. This advance movement of the plunger relatively to the vane is effected by raised portions of the cam 83, indicated in Fig. 9, at $a'$, $b'$ and $c'$. On the projection impulse of the spring being imparted to the vane the plunger is caused to follow the vane with a movement less than that of the projected movement of the vane so that the plunger will assume a slightly retracted position relatively to the vane as shown in Fig. 13 thereby reducing the tension of the spring 79; the plunger then being advanced and retracted in unison with the vane to maintain the spring under the reduced tension while the vane is traversing the several chambers and while the vane is being retracted by riding over the inwardly leading contours of the stator profile and while the vane is fully retracted so as to maintain a uniform end thrust on the vanes throughout the course of their travel over the stator profiles excepting at the points of projection of the vanes as previously pointed out. In this manner, the springs coact with the counterweights in preventing the vanes bearing on the stator profiles with excessive end thrust pressure. The springs 79 also serve to cushion retractive movement of the vanes.

This action of the cams on the plungers is particularly effective when the rotors are revolving at high speeds but when the rotors are revolving at low speeds and on initial starting of the engine, it is desirable that the plungers be advanced relatively to the vanes so as to place the springs under increased minimum compression so as to increase the end thrust pressure of the vanes on the stator and thereby obviate possible leaks of gas pressures over the ends of the vanes during low speed operations. This increase of vane end thrust is then effected by subjecting the plungers to the action of fluid pressure imparted to the pistons 85 on the inner ends thereof so as to effect advance of the plungers independent of the action of the cams 83; the fluid pressure being directed to the pistons through the passage 88 in the shaft B from any suitable automatically controlled source of fluid pressure supply not necessary to be here shown. The fluid employed for this purpose consists of a lubricating oil. Slight clearance is afforded between the pistons 85 and their encompassing walls and also between the plungers 76 and their encompassing walls to permit the passage of sufficient lubricant from beneath the pistons under the urge of centrifugal force to afford lubrication for the pistons and plungers and effect delivery of lubricant to the vanes and their guideways and associated relatively moving parts.

Where the rotors are equipped with pistons R (see Figs. 11 and 12) the cams 117 and 118 are profiled to effect disposing of the pistons in various successive positions relatively to the outer periphery of the rotor throughout a revolution of the latter as exaggeratedly illustrated in Fig. 12; the pistons being moved inwardly at the leading end of the intake chamber and maintained in their innermost positions while traversing the intake chamber then being advanced a portion of their outward stroke to effect compression of the charge at a point just preceding the ignition point so speedily as to permit an exceptionally high compression ratio without developing pre-ignition temperature, then being maintained in this partially advanced position until the vane preceding the piston enters chamber O whereupon the piston is moved outwardly the remainder of its stroke, in which position it is maintained as it is advanced past the exhaust passages to the point where it is retracted at the leading end of the intake chamber. The piston R is advanced when opposite the leading end of chamber O, so as to effect reduction of the latter and thereby create an increase in the working pressure of the charge on the outwardly moving vane as the latter enters the second expansion chamber O.

The extent of movements of the pistons R, communicated by the variable cams 117 and 118, determines the degree of compression obtained prior to ignition. Adjustment during operation in aeronautical or automotive engines makes possible the maintenance of sea level compression efficiency at high altitudes. Adjustment during operation of heavy fuel engines makes possible the use of the compression factor exactly suited to maximum efficiency with the particular fuel available.

The pistons R being fully advanced while passing the exhaust passages insures complete scavenging of the burned gas.

As the result of the design of this engine, in which the center bearing 58 takes all thrust and locates the relationship of all operating parts, and as a result of the introduction of cooling water and air to the center section and its distribution toward the ends lateral expansion due to rising temperatures is forced to act in both directions from the center across the width of the rotors and stators in such a manner as to maintain constantly the same working relationship of the parts cold or hot. The slidable mounting of the end bearings 56 and 57 relative to the stator permits creeping of the bearings without binding or friction.

By the provision of a pair of rotors either rotor may be placed out of operation where the work to be performed is reduced to come within the capacity of work of a single rotor, thus enabling the reduction of power production without lowering fuel efficiency.

This may be accomplished by providing cut-off valves 20' and 21' in the fuel feed lines 22' and 23' leading to the carburetors 67 and 68 whereby the fuel supply to either of the carburetors may be cut off and also by providing a pair of air intake tubes 24' and 25' leading through the stator sections 51 and 52 and opening to the compression chambers N and which air intake tubes are normally closed by cut-off valves 26' and 27' either of which may be opened to effect open communication between the compression chamber and atmosphere. By cutting off the fuel supply and opening the compression chamber of either of the rotors as by closing the valve 20' and opening valve 26' or closing valve 21' and opening valve 27' either of the rotors may be placed out of operation. When this is done the rotor placed out of operation will nevertheless continue to revolve idly, and the vanes thereof will function as before described, thereby maintaining the balanced relation between the pair of rotors.

In order to avoid flooding of the engine by excess accumulation of lubricant in the spaces within the engine as might occur where the engine is caused to assume various positions around its center, as in aeronautical operations, a series of drains 185 are provided which lead from the interiors of the stator end sections and the stator intermediate section at spaced points along the inner marginal portions thereof overlapping the rotor side plates, and communicate with a scavenge pump (not shown) to direct the excess lubricant to the source of supply.

While the use of a lubrication oil has hereinbefore been specified as employed as a sealing medium, it is obvious that any suitable fluid may be used for this purpose.

From the foregoing, it will be seen that by the construction and mode of operation described, I have employed the recognized power principles of compounded expansion with a prolongation of the power cycle and that the engine embodies in effect sixteen cylinders so arranged and functioning as to provide sixteen power impulses per revolution of the drive shaft. It will also be observed that by effecting the dual intake, compression, combustion, multi-stage expansion and exhaust at diametrically opposite peripheral portions of the rotors, and by effecting corresponding positioning of diametrically opposite blades of the rotors, an absolute dynamic and static balance is afforded at all phases and at all speeds in operation of the engine whereby vibration will be practically eliminated and waste movements and dead centers avoided. Furthermore, it will be seen that by the arrangement disclosed, the power cycle stroke is substantially equal in duration to the combined periods of the induction or intake, compression and exhaust cycles or strokes according to the heretofore recognized practice in internal combustion motors, and equal to the period of power stroke in a reciprocating engine regardless of crank shaft speed and whereby prolongation of the period of flame propagation, combustion and expansion is accomplished in such manner as to utilize fully the expansive value of the fuel and to practically eliminate power losses due to back pressure.

It will be understood that for extremely high duties, the induction of the fuel may be aided by the use of a blower or super-charger applied to the intakes and not necessary to be here shown.

It is to be understood that the manner of carrying the invention into effect is herein specifically set forth to enable those skilled in the art to make and use the same, and is to be considered as illustrating and not in a limiting sense; and that various changes and modifications may be made in the parts and in their construction and arrangement, and in the application and embodiments of the invention within the meaning of the terms of the appended claims and coming within the scope thereof without departure from the spirit of the invention.

I claim:

1. In a rotary internal combustion engine, a rotor, a stator having a profiled inner periphery encircling the rotor, a series of radially reciprocal vanes on said rotor operable to traverse the stator profile, means for delivering a fuel charge between adjacent vanes, and means carried by the rotor operable by rotation of the latter to effect compression of the fuel charge between contiguous vanes and between the rotor and the stator at various manually selectable portions of the stator profile.

2. In a rotary internal combustion engine, a rotor, a stator having a profiled inner periphery encircling the rotor, a series of radially reciprocal vanes on said rotor operable to traverse the stator profile, means for delivering an explosive fuel charge between adjacent vanes, means carried by the rotor operable by rotation of the latter to effect compression of the fuel charge between the contiguous vanes and between the rotor and the stator at a predetermined portion of the stator profile, and means for varying the moment of the peak of compression of the charge.

3. In a rotary internal combustion engine, a rotor, a series of spaced radially extending vanes on said rotor, a cylinder opening to the outer periphery of said rotor between contiguous vanes, a reciprocal piston in each of said cylinders, means operable on rotation of the rotor to actuate said pistons, and manually operable means acting on said last-named means for varying the zone of travel of said pistons.

4. In a rotary internal combustion engine, a rotor, a series of spaced radially extending vanes on said rotor, a cylinder opening to the outer periphery of said rotor between contiguous vanes, a reciprocal piston in each of said cylinders, means operable on rotation of the rotor to actuate said pistons, and manually controlled means for varying the zone of travel of said pistons.

5. In a rotary internal combustion engine, a rotor, a series of spaced radially extending vanes on said rotor, a cylinder opening to the outer periphery of said rotor between contiguous vanes, a reciprocal piston in each of said cylinders, means operable on rotation of the rotor to effect reciprocation of said pistons, and manually controlled means for varying the timing of the reciprocation of said pistons.

6. In a rotary internal combustion engine, a rotor, a plurality of radially reciprocal vanes on said rotor, a plurality of radially reciprocal pistons on said rotor, there being a piston arranged between contiguous vanes with their outer ends presented to the exterior of said rotor, a pair of cam rings, operative connections between said pistons and cam rings whereby rotation of the rotor will cooperate with the cam rings in effecting reciprocation of said pistons, said rings being contoured to effect such reciprocation of the pistons, and manually controlled means for shifting said cam rings circumferentially to vary the timing of the reciprocation of said pistons.

7. In a rotary internal combustion engine, a rotor, a series of radially reciprocal vanes on said rotor, a stator having a profiled inner periphery arranged to be traversed by said vanes, a series of cylinders on said rotor, there being a cylinder located between each pair of contiguous vanes and opening to the stator profile, a reciprocal piston in each of said cylinders, means for advancing and retracting each of said pistons operable by rotation of the rotor, means for delivering explosive fuel charges successively to the spaces between contiguous vanes and to the cylinders when the pistons are retracted, means included in said piston advancing and retracting means operable to effect sudden advance of the pistons successively to suddenly compress the explosive charges, and means operable on said piston advancing and retracting means for varying the zone of travel of said pistons.

8. In a rotary internal combustion engine, a rotor, a series of radially reciprocal vanes on said rotor, a stator having a profiled inner periphery arranged to be traversed by said vanes, a series of cylinders on said rotor, there being a cylinder located between each pair of contiguous vanes and opening to the stator profile, a reciprocal piston in each of said cylinders, means for advancing and retracting each of said pistons operable by rotation of the rotor, means for delivering explosive fuel charges successively to the spaces between contiguous vanes and to the cylinders when the pistons are retracted, means included in said piston advancing and retracting means operable to effect sudden advance of the pistons successively to suddenly compress the explosive charges, and means for varying the moment of the peak of compression of the explosive charges.

9. In a rotary internal combustion engine, a rotor, a plurality of radially reciprocal vanes on said rotor, a plurality of radially reciprocal pistons on said rotor, there being a piston arranged between contiguous vanes with their outer ends presented to the exterior of said rotor, a pair of cam rings, operative connections between said pistons and cam rings whereby rotation of the rotor will cooperate with the cam rings in effecting reciprocation of said pistons, said rings being contoured to effect such reciprocation of the pistons, and manually controlled means associated with said cam rings whereby the latter may be employed to vary the zone of travel of said pistons.

10. In a rotary internal combustion engine, a rotor, a radially reciprocal vane on said rotor, a radially reciprocal plunger on said rotor, a spring interposed between the plunger and vane, a cam operable to effect radial advance of said plunger on rotation of said rotor, and a stator having a profiled surface arranged to be traversed by the outer end of the vane, said cam being operable to cooperate with the stator profile to effect reciprocation of the vane and to vary the movement of the plunger relatively to the vane, and said cam being formed with portions for advancing said plunger to place said spring momentarily under maximum compression when the vane is in a fully retracted position, and also during an interval when said vane is in a partly projected position.

11. In a rotary internal combustion engine, a rotor, a radially reciprocal vane on said rotor, a radially reciprocal plunger on said rotor, a spring interposed between the plunger and vane, a cam operable to effect radial advance of said plunger on rotation of said rotor, a stator having a profiled surface arranged to be traversed by the outer end of the vane, said cam being operable to cooperate with the stator profile to effect reciprotion of the vane and to vary the movement of the plunger relatively to the vane, and fluid pressure operated means for advancing said plungers independently of the action of the cam thereon.

12. In a rotary internal combustion engine, a rotor, a plurality of radially reciprocal vanes on said rotor, a stator having a profiled inner periphery arranged to be traversed by said vanes as the rotor revolves, means cooperating with the stator profile to effect reciprocation of said vanes as the rotor revolves, fluid pressure operated means for exerting yieldable outward pressure on said vanes, and cam means for effecting momentary increase of the outward pressure on said vanes at predetermined intervals.

13. In a rotary internal combustion engine, a stator having a central section, end sections and annular sections interposed between the intermediate and end sections, a shaft journaled in the intermediate section and in the end sections, a pair of rotors affixed to said shaft arranged on opposite sides of the intermediate stator section and encircled by the annular stator sections, and a series of at least eight equi-spaced radially reciprocal vanes on each rotor arranged to traverse the stator sections, said annular stator sections being profiled on their inner peripheries relatively to each other to provide in conjunction with portions of said rotors and of the series of vanes thereon intake compression, compounding multi-stage expansion and exhaust chambers on the inner periphery of one annular stator section extending diametrically opposite corresponding chambers on the other annular stator section, means cooperating with the stator profiles to effect radial reciprocation of said vanes on rotation of the rotors; said last named means including springs exerting outward thrusts on each of said vanes, fluid operated plungers on which said springs seat, and cam means for actuating said plungers.

14. In a rotary internal combustion engine, a rotor, side plates on said rotor projecting beyond the outer periphery thereof, radially reciprocal vanes on said rotor extending between said side plates, a stator encircling said rotor having sections overlapping the outer marginal portions of the rotor side plates on opposite sides thereof and including the outer peripheries of said side plates, there being a clearance space between the contiguous surfaces of the side plates and the stator, fluid conduits in the stator extending contiguous the inner periphery thereof adjacent the inner faces of the rotor side plates having a series of spaced discharge outlets leading to the clearance spaces, means for delivering a sealing fluid to said conduits, and means for regulating the flow of the sealing fluid from said conduit through each of the discharge outlets.

15. In a rotary internal combustion engine, a rotor, side plates on said rotor projecting beyond the outer periphery thereof, radially reciprocal vanes on said rotor extending between said side plates, a stator encircling said rotor having sections overlapping the outer marginal portions of the rotor side plates on opposite sides thereof and including the outer peripheries of said side plates, there being a clearance space between the contiguous surfaces of the side plates and the stator fluid conduits in the stator extending contiguous the inner periphery thereof adjacent the inner faces of the rotor side plates having a series of spaced discharge outlets leading to the clearance spaces, means for delivering a sealing fluid to said conduits, means for regulating the flow of the sealing fluid from said conduit through each of the discharge outlets, and means operable from the exterior of the stator for cleaning said outlets.

16. In a rotary internal combustion engine, a rotor, a stator, side plates on the rotor projecting into and overlapped on their opposite sides by the stator with a clearance space between the contiguous surfaces of the side plates and stator, means for delivering a sealing fluid from the exterior of the stator to the clearance space, said clearance space extending around the peripheral portions of said side plates equal distances on the opposite sides thereof forming a clearance space of U-cross section, the inner portion of which leads to the outer periphery of the rotor in open communication therewith and the outer portion of which is in open communication with the inner portion and leads to the interior of the stator in open communication therewith.

17. In a rotary internal combustion engine, a rotor, a series of at least eight equi-spaced radially reciprocal vanes, carried by said rotor, a stator encompassing said rotor having a profiled inner periphery, an intake passage leading to the stator profile, an exhaust passage leading from the stator profile, the stator being profiled to extend contiguous the rotor between said intake and exhaust passage and being profiled to extend in spaced relation to the rotor periphery to form with a portion of said series of vanes and of the rotor an intake chamber leading from said intake passage and having a wall portion extending in close proximity to the outer periphery of the rotor to form between the stator and rotor in conjunction with a portion of said series of vanes a compression chamber and being profiled to form with a portion of said series of vanes and of said rotor a compounding multi-stage expansion chamber leading from said compression chamber and extending approximately one-quarter the length of the inner periphery of the stator and being profiled to form in conjunction with a portion of said series of vanes a second stage compounded charge expansion chamber leading to said exhaust passage, and means carried by the rotor operable to vary the degree of compression capacity of the spaces between adjacent vanes.

18. In a rotary internal combustion engine, a rotor, a series of at least eight equi-spaced radial reciprocal vanes, carried by said rotor, a stator encompassing said rotor having a profiled inner periphery, an intake passage leading to the stator profile, an exhaust passage leading from the stator profile, the stator being profiled to extend contiguous the rotor between said intake and exhaust passage and being profiled to extend in spaced relation to the rotor periphery to form with a portion of said series of vanes and of the rotor an intake chamber leading from said intake passage and having a wall portion extending in close proximity to the outer periphery of the rotor to form between the stator and rotor in conjunction with a portion of said series of vanes a compression and combustion chamber and being profiled to form with a portion of said series of vanes and of said rotor a compounding multi-stage expansion chamber leading from said compression chamber and extending approximately one-quarter the length of the inner periphery of the stator and being profiled to form in conjunction with a portion of said series of vanes a second stage compounded charge expansion chamber leading to said exhaust passage, means for effecting an explosive impulse behind a vane in said combustion chamber, means included in the structure of said first named expansion chamber to combine and merge the expansive gases of two fuel charges combusted in said combustion chamber to operate simultaneously on two of the said series of vanes in said expansion chambers, pistons carried on the rotor between adjacent vanes, and manually controlled means acting on said pistons for varying the moment of the peak of expansion pressures in said expansion chambers.

19. In a rotary internal combustion engine, means for effecting compression of a fuel charge, and manually controlled means for varying the moment of peak of compression of the charge.

20. In an internal combustion engine, means for compressing a fuel charge, means for igniting the compressed charge to effect combustion and expansion thereof, and manually operable means for controlling the moment of the peak of expansion pressure of the combusted charge.

21. In a rotary internal combustion engine, a drive shaft, a pair of rotors affixed to said drive shaft, a plurality of spaced radially reciprocal vanes on each of said rotors, an annular stator section encircling each of said rotors, each of said sections having a profiled inner periphery arranged to be traversed by the vanes on said rotors as said rotors revolve, the inner peripheries of said annular stator sections being contoured to form in conjunction with the spaces between contiguous vanes on its associated rotor an intake chamber, a compression chamber, a combustion chamber, an expansion chamber and an exhaust chamber in successive arrangement in the order named, a water jacket formed in each of said annular stator sections encircling the profiled inner periphery thereof, an intermediate stator section affixed to said annular stator sections having a pair of separated annular water jackets communicating with the water jacket in said annular sections through apertures of various areas, end stator sections overlying the outer portions of the opposite sides of said rotors formed with water jackets communicating with the water jacket in the annular stator sections through a series of various areas of apertures; there being a series of said apertures of relatively large area affording a communication between said water jackets adjacent the combustion, expansion and exhaust chambers for permitting a free lateral flow of the cooling liquid over the stator walls of said chambers, and there being a series of said apertures of relatively small areas affording a communication between said water jackets adjacent the intake and compression chambers for restricting lateral flow of the cooling liquid over the stator walls forming said chambers, a cold water intake leading to the water jackets in said intermediate stator section, and hot water outlets leading from the water jackets in said end sections.

22. In a rotary internal combustion engine, a rotor, a stator having a profiled inner periphery encircling said rotor, a series of equi-spaced radially reciprocal vanes on said rotor arranged to traverse the stator profile, said stator profile being formed to provide with said series of vanes as said vanes advance with said rotor, an intake chamber, a compression chamber, a combustion chamber, a plurality of expansion chambers, and an exhaust chamber; said stator profile being formed with a series of restricted grooves of a length less than the distance between adjacent vanes arranged to afford a communication between said combustion chamber and a leading expansion chamber over the outer end of the vane separating said combustion chamber from said leading expansion chamber while said vane is traversing said grooves, and means for exploding a charge behind a vane approaching said grooves.

23. The structure called for in claim 22 together with manually controlled means for varying the capacities of said intake, compression, combustion and expansion chambers.

24. The structure called for in claim 22 together with manually controlled means for varying the capacities of said intake, compression, combustion and expansion chambers at various moments during rotation of said rotor.

25. The structure called for in claim 22 together with cylinders opening to the outer periphery of said rotor between contiguous vanes, a reciprocal piston in each of said cylinders, and manually controlled means operable on rotation of the rotor to effect reciprocation of said pistons to vary the capacities of said compression, combustion and expansion chambers at will.

26. In a rotary internal combustion engine, a rotor, a stator having a profiled inner periphery encircling the rotor, a series of at least eight equi-spaced radially reciprocal vanes on said rotor arranged to traverse the stator profile, said stator being profiled on one half of its inner periphery to form with a portion of said vanes, intake, compression and exhaust chambers and being profiled on the other half of its inner periphery to provide with another portion of said vanes and said rotor, a combustion chamber between one pair of said vanes and said rotor, and a series of not less than three expansion chambers, said stator profile being formed with a series of restricted grooves in the first of said expansion chambers through which two of said chambers are alternately brought into communication and cut off by the vanes traversing said grooves, said grooves being of a length slightly less than the distance between a pair of contiguous vanes, said rotor being formed with cylinders between each pair of vanes, reciprocal pistons in each of said cylinders for varying the capacity of the chambers between said vanes, means for reciprocating said pistons, and manually operated means for regulating the length of stroke of said pistons.

27. In a rotary internal combustion engine, a rotor, a stator having a profiled inner periphery encircling the rotor, a series of at least eight equi-spaced radially reciprocal vanes on said rotor arranged to traverse the stator profile, said stator being profiled on one half of its inner periphery to form with a portion of said vanes, intake, compression and exhaust chambers and being profiled on the other half of its inner periphery to provide with another portion of said vanes and said rotor, a combustion chamber between one pair of said vanes and said rotor, and a series of not less than three expansion chambers, said stator profile being formed with a series of restricted grooves in the first of said expansion chambers through which two of said chambers are alternately brought into communication and cut off by the vanes traversing said grooves, said grooves being of a length slightly less than the distance between a pair of contiguous vanes, said rotor being formed with cylinders between each pair of vanes, reciprocal pistons in each of said cylinders for varying the capacity of the cylinders between said vanes, means for reciprocating said pistons, manually operated means for regulating the length of stroke of said pistons, and manually operated means for regulating time of occurrence of peak of compression stroke of said pistons.

28. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, a series of grooves of restricted area in the inner periphery of the stator in that portion thereof forming the first expansion chamber for permitting a portion of the gases expanding in said chamber to pass over and beyond the vane behind which the gases were ignited and in contact therewith to exert in conjunction with the gases remaining in the expansion chamber ahead of said vane their expansive force on a preceding vane as the preceding vane traverses succeeding expansion chambers and for prolonging the period of combustion and expansion by the value of the time element required for the gases to traverse the distance between two vanes; cylinders in said rotor, reciprocal pistons in said cylinders, and manually operable means for controlling the length and time of stroke of said pistons with reference to the position of said rotor in said stator.

29. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, a series of grooves of restricted area in the inner periphery of the stator in that portion thereof forming the first expansion chamber for permitting a portion of the gases expanding in said chamber to pass over and beyond the vane behind which the gases were ignited and in contact therewith into a succeeding expansion chamber to cause gases resulting from the combustion of at least two separate fuel charges in said combustion chamber to unite, combine and merge during the process of expansion to effect compounded expansion to exert force due to expansion on a vane in two succeeding expansion chambers, and to prolong the period of combustion and expansion by the value of the time element required for the gases to traverse the distance between two vanes; cylinders in said rotor, reciprocal pistons in said cylinders, and manually operable means for controlling the length and time of stroke of said pistons with reference to the position of said rotor in said stator.

30. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, means for directing a portion of the gases expanding in the first expansion chamber over and beyond the vane behind which the gases were ignited as it traverses this chamber to exert force on this vane from the kinetic energy of the expanding gases and to exert force by expansion on a preceding vane in a succeeding expansion chamber, and to prolong the period of combustion and expansion of the gases, cylinders in said rotor, reciprocal pistons in said cylinders, and manually operable means for controlling the length and time of stroke of said pistons with reference to the position of said rotor in said stator.

31. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, means for directing a portion of the gases expanding in the first expansion chamber over and beyond the vane behind which the gases were ignited as it traverses this chamber to exert force on this vane from the kinetic energy of the expanding gases and to exert force by expansion on a preceding vane in a succeeding expansion chamber, and to prolong the period of combustion and expansion of the gases, and to continue to exert force on this vane in another succeeding expansion chamber, this chamber being of greater depth than the preceding expansion chamber for presenting to the expansive force of the gases a greater area of vane projected therein than was presented in the preceding chamber, cylinders in said rotor, reciprocal pistons in said cylinders, and manually operable means for controlling the length and time of stroke of said pistons with reference to the position of said rotor in said stator.

32. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, and a plurality of communicating expansion chambers formed in conjunction with another portion of said plurality of vanes and the said rotor on the inner periphery of said stator leading from the combustion chamber, a series of grooves of restricted area in the inner periphery of the stator in that portion thereof forming the first expansion chamber for permitting a portion of the gases expanding in said chamber to pass over and beyond the vane behind which the gases were ignited and in contact therewith for prolonging the period of combustion and expansion by the value of the time element required for the gases to traverse the distance between two vanes; and to exert in conjunction with the gases remaining in the expansion chamber ahead of said vane their expansive force on a preceding vane as the preceding vane traverses a succeeding expansion chamber, and to continue to exert force on this vane in another succeeding expansion chamber, this chamber being of greater depth than the preceding expansion chamber for presenting to the expansive force of the gases a greater area of vane projected therein than was presented in the preceding chamber; cylinders in said rotor, reciprocal pistons in said cylinders, and manually operable means for controlling the length and time of stroke of said pistons with reference to the position of said rotor in said stator.

33. In a rotary internal combustion engine, a rotor, side plates on said rotor projecting beyond the outer periphery thereof, radially reciprocal vanes on said rotor extending between said side plates, a stator enclosing said rotor having wall portions overlying the inner and outer side faces of the marginal portions of said side plates and wall portions extending across the peripheries of said side plates, said wall portions being spaced from said side plates to form a limited clearance space throughout the overlapping contiguous surfaces of the stator and side plates, said stator also having a wall portion encircling the rotor between said side plates profiled on its inner periphery to provide with said vanes and said rotor intake, compression, combustion, expansion and exhaust chambers, the wall portions of said stator overlying the outer side faces of said side plates having a profiled inner periphery substantially conforming to the profiled inner periphery of the rotor encircling portion of the stator, means for delivering a sealing liquid under pressure into said clearance space to form an exclusively liquid seal throughout said space on rotation of said rotor.

34. In a rotary internal combustion engine, a rotor, side plates on said rotor projecting beyond the outer periphery thereof, radially reciprocal vanes on said rotor extending between said side plates, a stator enclosing said rotor having wall portions overlying the inner and outer side faces of the marginal portions of said side plates and wall portions extending across the peripheries of said side plates, said wall portions being spaced from said side plates to form a limited clearance space throughout the overlapping contiguous surfaces of the stator and side plates, said stator also having a wall portion encircling the rotor between said side plates profiled on its inner periphery to provide with said vanes and said rotor intake, compression, combustion, expansion and exhaust chambers; the wall portions of said stator overlying the outer side faces of said side plates having a profiled inner periphery substantially conforming to the profiled inner periphery of the rotor encircling portion of the stator, externally regulated means for delivering a sealing liquid under pressure into said clearance space at spaced intervals to form an exclusively liquid seal throughout said space on rotation of said rotor.

35. In a rotary internal combustion engine, a rotor, side plates on said rotor projecting beyond the outer periphery thereof, radially reciprocal vanes on said rotor extending between said side plates, a stator enclosing said rotor having wall portions overlying the inner and outer side faces of the marginal portions of said side plates and wall portions extending across the peripheries of said side plates, said wall portions being spaced from said side plates to form a limited clearance space throughout the overlapping contiguous surfaces of the stator and side plates, said stator also having a wall portion encircling the rotor between said side plates profiled on its inner periphery to provide with said vanes and said rotor intake, compression, combustion, expansion and exhaust chambers; the wall portions of said stator overlying the outer side faces of said side plates having a profiled inner periphery substantially conforming to the profiled inner periphery of the rotor encircling portion of the stator, fluid conduits in the stator extending contiguous the profiled inner periphery thereof adjacent the inner faces of the rotor side plates, said conduits having a series of externally regulated spaced discharge outlets leading to the clearance spaces, and means for delivering in externally regulated volume a lubricating and sealing liquid under pressure through said conduits to said clearance spaces, said side plates being adapted on rotation thereof to maintain the liquid seal under pressure in said clearance space.

36. In a rotary internal combustion engine, a stator, a rotor revolubly mounted in said stator and spaced therefrom to form a clearance space in open communication throughout the contiguous surfaces of said rotor and stator; and means for maintaining an exclusively liquid seal under pressure in said clearance space for sealing against pressure losses between said rotor and stator, including externally regulated means for delivering liquid under pressure to said clearance space, and extended side plates on the rotor for generating pressure in the liquid in said space by centrifugal action.

37. In a rotary internal combustion engine, a rotor, a stator having a profiled inner periphery encircling the rotor, a series of at least eight equi-spaced radially reciprocal vanes on said rotor arranged to traverse the stator profile, said stator being profiled on one half of its inner periphery to form with a portion of said vanes, intake, compression and exhaust chambers and being profiled on the other half of its inner periphery to provide with another portion of said vanes and said rotor, a combustion chamber between one pair of said vanes and said rotor, and a series of not less than three expansion chambers, said stator profile being formed with a series of restricted grooves in the first of said expansion chambers through which two of said chambers are alternately brought into communication and cut off by the vanes traversing said grooves, said grooves being of a length slightly less than the distance between a pair of contiguous vanes.

38. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, a series of grooves of restricted area in the inner periphery of the stator in that portion thereof forming the first expansion chamber for permitting a portion of the gases expanding in said chamber to pass over and beyond the vane behind which the gases were ignited and in contact therewith to exert in conjunction with the gases remaining in the expansion chamber ahead of said vane their expansive force on a preceding vane as the preceding vane traverses succeeding expansion chambers and for prolonging the period of combustion and expansion by the value of the time element required for the gases to traverse the distance between two vanes.

39. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, a series of grooves of restricted area in the inner periphery of the stator in that portion thereof forming the first expansion chamber for permitting a portion of the gases expanding in said chamber to pass over and beyond the vane behind which the gases were ignited and in contact therewith into a succeeding expansion chamber to cause gases resulting from the combustion of at least two separate fuel charges in said combustion chamber to unite, combine and merge during the process of expansion to effect compounded expansion to exert force due to expansion on a vane in two succeeding expansion chambers, and to prolong the period of combustion and expansion by the value of the time element required for the gases to traverse the distance between two vanes.

40. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, means for directing a portion of the gases expanding in the first expansion chamber over and beyond the vane behind which the gases were ignited as it traverses this chamber to exert force on this vane from the kinetic energy of the expanding gases and to exert force by expansion on a preceding vane in a succeeding expansion chamber, and to prolong the period of combustion and expansion of the gases.

41. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, a plurality of communicating expansion chambers formed in conjunction with another portion of said plurality of vanes and the said rotor on the inner periphery of said stator leading from the combustion chamber, means for directing a portion of the gases expanding in the first expansion chamber over and beyond the vane behind which the gases were ignited as it traverses this chamber to exert force on this vane from the kinetic energy of the expanding gases and to exert force by expansion on a preceding vane in a succeeding expansion chamber and to prolong the period of combustion and expansion of the gases, and to continue to exert force on this vane in another succeeding expansion chamber, this chamber being of greater depth than the preceding expansion chamber for presenting to the expansive force of the gases a greater area of vane projected therein than was presented in the preceding chamber.

42. In a rotary internal combustion engine, a rotor, a stator encircling the rotor, a plurality of radially reciprocal vanes carried by the rotor operable on the rotation of the rotor to traverse at their outer ends the inner periphery of the stator; intake, compression and combustion chambers formed in conjunction with a portion of said plurality of vanes and said rotor successively on the inner periphery of said stator, and a plurality of communicating expansion chambers formed in conjunction with another portion of said plurality of vanes and the said rotor on the inner periphery of said stator leading from the combustion chamber, a series of grooves of restricted area in the inner periphery of the stator in that portion thereof forming the first expansion chamber for permitting a portion of the gases expanding in said chamber to pass over and beyond the vane behind which the gases were ignited and in contact therewith for prolonging the period of combustion and expansion by the value of the time element required for the gases to traverse the distance between two vanes, and to exert in conjunction with the gases remaining in the expansion chamber ahead of said vane their expansive force on a preceding vane as the preceding vane traverses a succeeding expansion chamber, and to continue to exert force on this vane in another succeeding expansion chamber, this chamber being of greater depth than the preceding expansion chamber for presenting to the expansive force of the gases a greater area of vane projected therein than was presented in the preceding chamber.

GEORGE W. SKOULAND.